(12) United States Patent
Texidor

(10) Patent No.: US 10,244,677 B2
(45) Date of Patent: Apr. 2, 2019

(54) HAND TOOLS HAVING A PROTECTIVE HAND GUARD

(71) Applicant: Genaro Texidor, Valdosta, GA (US)

(72) Inventor: Genaro Texidor, Valdosta, GA (US)

( * ) Notice: Subject to any disclaimer, the term of this patent is extended or adjusted under 35 U.S.C. 154(b) by 0 days.

(21) Appl. No.: 15/334,531

(22) Filed: Oct. 26, 2016

(65) Prior Publication Data

US 2017/0112051 A1    Apr. 27, 2017

Related U.S. Application Data

(60) Provisional application No. 62/246,407, filed on Oct. 26, 2015.

(51) Int. Cl.

| A01D 7/00 | (2006.01) |
|---|---|
| A01D 7/10 | (2006.01) |
| A01B 1/00 | (2006.01) |
| A01D 7/06 | (2006.01) |
| B25G 1/10 | (2006.01) |
| B05C 17/02 | (2006.01) |
| A01B 1/06 | (2006.01) |
| A01B 1/14 | (2006.01) |
| B25G 1/04 | (2006.01) |
| B25G 1/06 | (2006.01) |
| A01D 51/00 | (2006.01) |

(52) U.S. Cl.
CPC .................. *A01D 7/10* (2013.01); *A01B 1/00* (2013.01); *A01B 1/06* (2013.01); *A01B 1/14* (2013.01); *A01D 7/00* (2013.01); *A01D 7/06* (2013.01); *A01D 51/002* (2013.01); *B05C 17/022* (2013.01); *B05C 17/0205* (2013.01); *B05C 17/0245* (2013.01); *B25G 1/04* (2013.01); *B25G 1/06* (2013.01); *B25G 1/102* (2013.01)

(58) Field of Classification Search
USPC ............. 172/370, 378; 2/160, 161.6; 294/25
See application file for complete search history.

(56) References Cited

U.S. PATENT DOCUMENTS

| 345,846 | A | * | 7/1886 | Holmes | B66C 1/32 |
|---|---|---|---|---|---|
| | | | | | 294/117 |
| 567,087 | A | * | 9/1896 | Fitzgerald | F24B 15/10 |
| | | | | | 294/106 |
| 1,772,113 | A | * | 8/1930 | Wade | A01D 7/06 |
| | | | | | 56/400.01 |
| 2,205,827 | A | * | 6/1940 | Brooke | A01D 7/06 |
| | | | | | 56/400.17 |

(Continued)

*Primary Examiner* — Alicia Torres
(74) *Attorney, Agent, or Firm* — Eversheds Sutherland (US) LLP

(57) ABSTRACT

Hand tools having a hand guard for protecting a user's working hand. In one embodiment, the hand tool may be a hand rake that includes a rake body having a proximal end and an opposite distal end and including a handle portion and a rake portion. The handle portion may extend from the proximal end of the rake body and include a finger opening configured to receive a user's fingers therethrough. The rake portion may extend from the distal end of the rake body to the handle portion and include a plurality of tines. A hand guard may be attached to the rake body and positioned over a top surface of the handle portion and may include a plurality of walls defining an interior space configured to receive the user's hand therein. In other embodiments, the hand tool may be a grabber or a paint roller.

20 Claims, 13 Drawing Sheets

(56) References Cited

U.S. PATENT DOCUMENTS

| | | | |
|---|---|---|---|
| 2,717,546 A | 9/1955 | Ryden | |
| 2,847,816 A * | 8/1958 | Yeda | A01D 7/06 56/400.17 |
| 2,954,832 A | 10/1960 | Pirone | |
| 2,999,350 A * | 9/1961 | Dettman | A01D 7/06 56/400.17 |
| 3,095,682 A * | 7/1963 | Pasquine | A01D 7/10 56/400.08 |
| 3,477,756 A * | 11/1969 | Castro | A01D 75/20 294/131 |
| 3,593,803 A | 7/1971 | Ibach | |
| 4,089,379 A | 5/1978 | Crownover | |
| 4,149,601 A | 4/1979 | Taylor | |
| 4,474,246 A | 10/1984 | Arroyo | |
| 4,528,714 A | 7/1985 | Beck | |
| 4,867,246 A | 9/1989 | Kiger | |
| 5,359,840 A * | 11/1994 | Costar | A01D 51/00 172/378 |
| 5,609,012 A | 3/1997 | Anthes et al. | |
| 5,644,796 A | 7/1997 | Laughlin | |
| 5,785,369 A * | 7/1998 | Ridley, Sr. | A01D 51/00 15/257.1 |
| 5,813,206 A * | 9/1998 | McKittrick | A01B 1/00 172/371 |
| 5,887,283 A | 3/1999 | MacKay | |
| 6,058,510 A | 5/2000 | Breitenbach | |
| D447,922 S * | 9/2001 | Whitlock | D8/13 |
| 7,347,469 B1 * | 3/2008 | Renganathan | A01B 1/00 294/176 |
| D616,273 S | 5/2010 | Cohen et al. | |
| D631,206 S | 1/2011 | Parlee | |
| 8,856,966 B2 | 10/2014 | Doty | |
| 2002/0129594 A1* | 9/2002 | Gullotti | A01D 7/00 56/400.01 |
| 2010/0306947 A1* | 12/2010 | White | A47L 1/06 15/236.02 |
| 2012/0317954 A1 | 12/2012 | Landicini, Jr. et al. | |

* cited by examiner

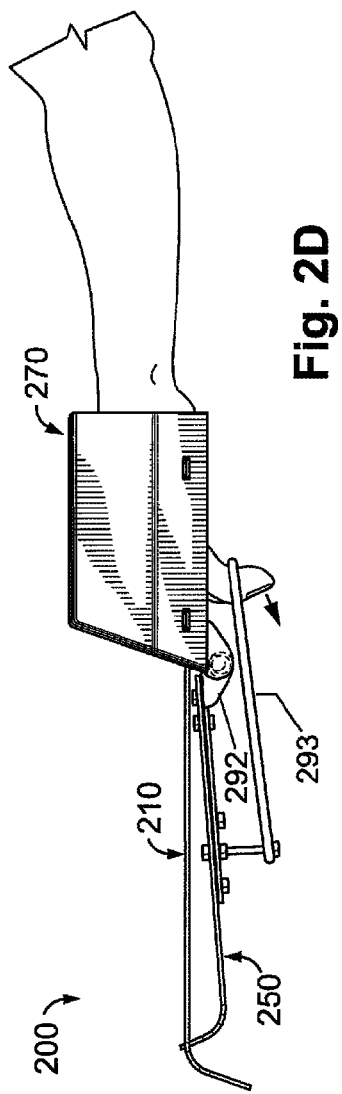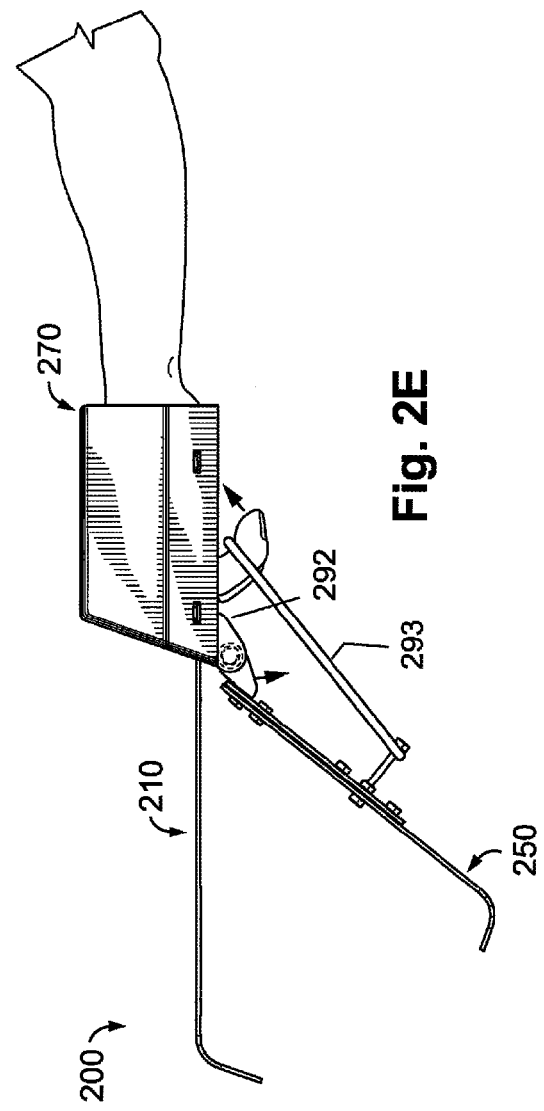

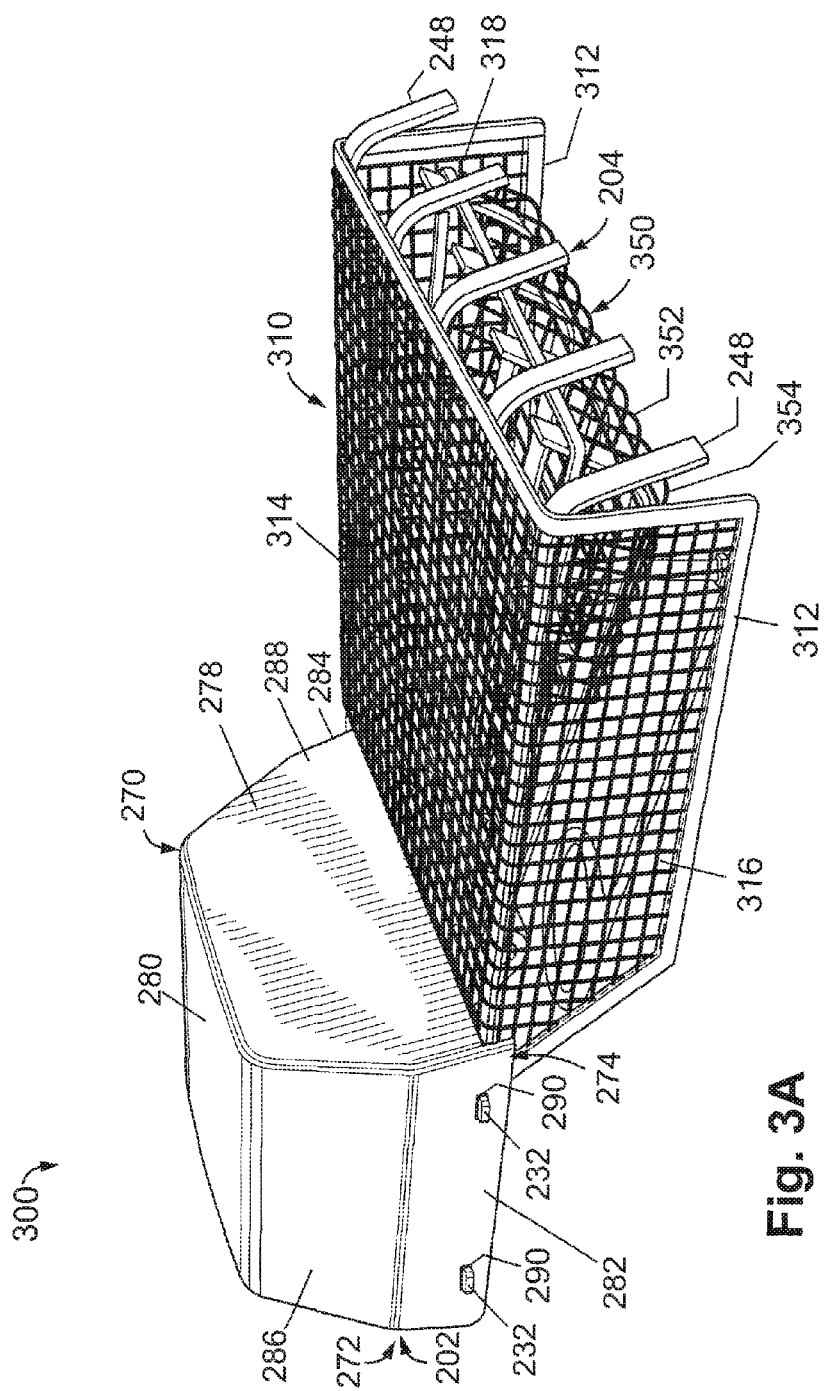

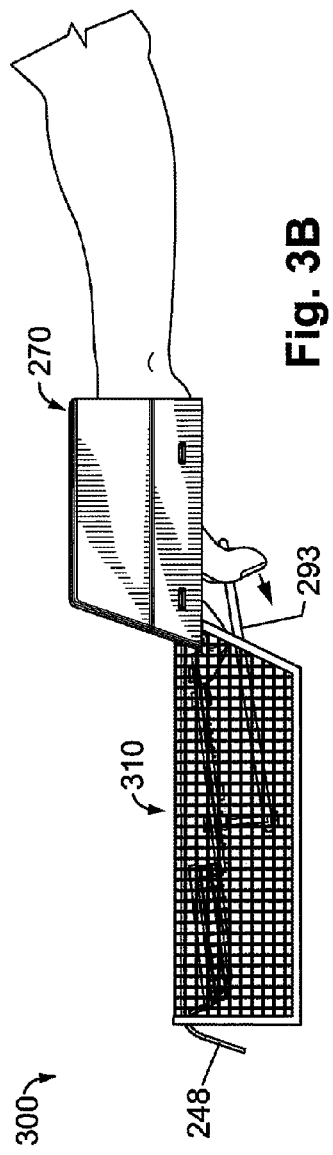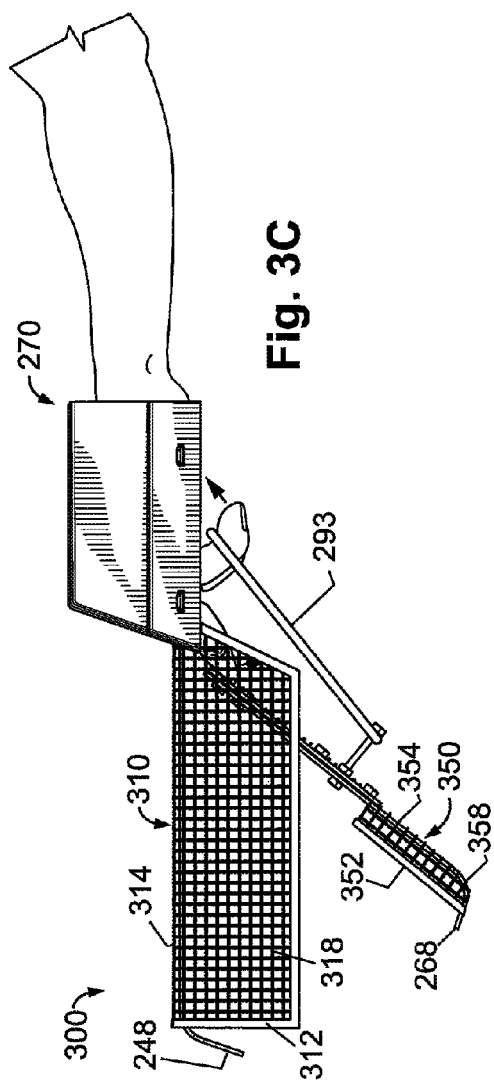

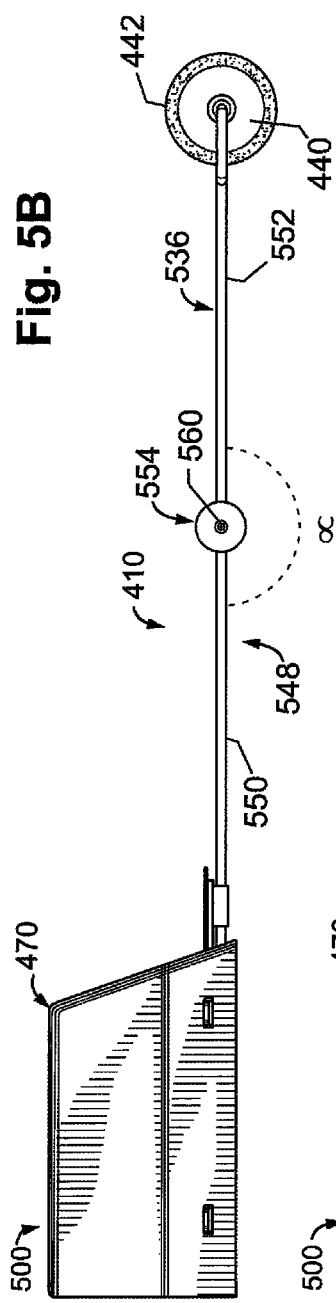

HAND TOOLS HAVING A PROTECTIVE HAND GUARD

CROSS-REFERENCE TO RELATED APPLICATIONS

This application claims the benefit of U.S. Provisional Application No. 62/246,407, filed on Oct. 26, 2015, which is incorporated by reference herein in its entirety.

FIELD OF THE DISCLOSURE

The present disclosure relates generally to hand tools and more particularly to hand tools having a hand guard for protecting a user's hand during use of the tool.

BACKGROUND OF THE DISCLOSURE

Various types of hand tools are known in the art to assist a user in effectively performing a variety of gardening, yardwork, and home improvement tasks by hand. For example, hand rakes are often used by gardeners and homeowners for tilling soil, gathering garden and yard debris, or collecting other items on the ground. As another example, hand-operated "grabbers" or "pick-ups" may be used to more efficiently pick up a number of items from the ground, as compared to simply picking up the items by hand one-by-one. Still other examples of hand tools include paint rollers and hand sanders, which allow a user to quickly paint or sand various surfaces, such as walls, and are often preferred over traditional paint brushes and unsupported sand paper.

Known hand tools are frequently designed to allow a user to operate the tool with a single hand (i.e., the user's "working hand") while squatting, kneeling, or seated on the ground or while standing near a work surface or area. In this manner, while using the hand tool, the user's opposite hand (i.e., the user's "free hand") may be used to support the user on or relative to the ground, to steady the user relative to the working surface or area, or to perform other tasks. Although known single-handed hand tools may be effective in performing the desired tasks, such tools often leave the user's working hand exposed to the surrounding environment and/or the working surface or area, which may be undesirable for several reasons.

For example, when a conventional hand rake, grabber, or other hand tool is used in a garden or around plants, shrubs, or groundcover, the user's working hand may remain largely exposed as the user extends the tool into or around the working area. Consequently, the exposed working hand potentially may be cut, scraped, or otherwise harmed or irritated by direct contact with plants, shrubs, brush, sticks, thorns, briars, or other garden or yard debris present in the working area. Additionally, the user's working hand may potentially be bitten or stung by snakes, vermin, other pests, bees, yellow jackets, wasps, ants, or other insects that may be concealed from the user's view in the working area. Furthermore, the user's fingernails and/or nail polish applied thereto may be damaged, and dirt may accumulate under the fingernails during continued use of the hand tool. Although some people may wear gloves while gardening or performing other yardwork tasks, conventional gloves often do not provide sufficient protection from cuts, scrapes, bites, stings, or other damage that may occur to the user's hands or fingernails. Additionally, wearing conventional gloves while using a hand rake, grabber, or other hand tool may be undesirable due a loss of tactile feel, difficulty gripping the tool, or increased sweating of the user's working hand during hot weather.

Other problems may exist when using a conventional paint roller, hand sander, or other hand tool to perform various home improvement tasks. For example, when using a conventional paint roller for an extended period of time, the user's exposed working hand may become covered with paint that sprays during rotation of the roller cover. Such paint spray may be difficult and time consuming to remove, particularly from the user's fingernails and cuticles. When using a conventional hand sander, the user's exposed working hand may inadvertently come into direct contact with the working surface being sanded or other surrounding surfaces as the user moves the sander back and forth, which may result in cuts, scrapes, bruises, splinters, or other harm to the working hand. Additionally, the user's working hand may become covered with dust or other debris created during sanding, which may irritate the skin, depending on the nature of the dust material. In view of these problems, some users may wear gloves while painting, sanding, or performing other home improvement tasks with hand tools. However, use of conventional gloves may be undesirable due to a loss of tactile feel, difficulty grasping the tool, or increased sweating of the user's working hand, all of which may affect the quality of the task being performed.

Accordingly, there remains a need for improved hand tools, such as hand rakes, grabbers, paint rollers, hand sanders, and other hand-operated tools that adequately protect a user's working hand from potential harm during use of the tools. Such hand tools should allow a user to perform gardening, yardwork, or home improvement tasks without worry of harm to the user's working hand and without the need for gloves.

SUMMARY OF THE DISCLOSURE

Various embodiments described herein provide hand tools for performing gardening, yardwork, or home improvement tasks while protecting a user's working hand from potential harm during use of the tools.

According to one aspect, a hand rake is provided. In one embodiment, the hand rake may include a rake body having a proximal end and an opposite distal end and including a handle portion and a rake portion, and a hand guard attached to the rake body. The handle portion may extend from the proximal end of the rake body and include a finger opening configured to receive a user's fingers therethrough. The rake portion may extend from the distal end of the rake body to the handle portion and include a plurality of tines. The hand guard may be positioned over a top surface of the handle portion and may include a plurality of walls defining an interior space configured to receive the user's hand therein.

In certain embodiments, the hand guard may be fixedly attached to the rake body. In certain embodiments, the hand guard may be removably attached to the rake body. In certain embodiments, the handle portion may include a plurality of tabs, the hand guard may include a plurality of mounting holes, and the hand guard may be attached to the rake body via the tabs received within the mounting holes. In certain embodiments, the handle portion may include a cross-member extending along a width of the rake body and positioned between the first end of the rake body and the finger opening, and the hand rake may include a top grip member positioned on a top surface of the cross-member and a bottom grip member positioned on a bottom surface of the cross-member. In certain embodiments, the rake portion may include a plurality of cross-members extending between adjacent tines and oriented transverse to a longitudinal extent of the tines. In certain embodiments, the handle portion may have a planar shape, and a majority of the rake portion may have a planar shape and be coplanar with the handle portion.

In certain embodiments, the hand guard may include an open proximal end and an opposite, closed distal end, and the plurality of walls of the hand guard may include a front wall, a top wall, a first sidewall, a second sidewall, a first transition wall, and a second transition wall. The front wall may be positioned along the distal end of the hand guard and have a planar or substantially planar shape. The top wall may extend from the proximal end of the hand guard to the front wall and have a planar or substantially planar shape. The first sidewall may extend from the proximal end of the hand guard to the front wall and have a planar or substantially planar shape. The second sidewall may extend from the proximal end of the hand guard to the front wall and have a planar or substantially planar shape. The first transition wall may extend from the proximal end of the hand guard to the front wall and from the first sidewall to the top wall and have a planar or substantially planar shape. The second transition wall may extend from the proximal end of the hand guard to the front wall and from the second sidewall to the top wall and have a planar or substantially planar shape. In certain embodiments, the rake body may be formed of sheet metal, and the hand guard may be formed of plastic. In certain embodiments, the hand rake also may include a lower guard attached to the rake body or the hand guard and positioned over a bottom surface of the handle portion, and the lower guard may define an interior space configured to receive the user's hand therein.

According to another aspect, a grabber is provided. In one embodiment, the grabber may include a top rake body, a bottom rake body pivotally attached to the top rake body, and a hand guard attached to the top rake body. The top rake body may have a proximal end and an opposite distal end and may include a handle portion and a rake portion. The handle portion may extend from the proximal end of the top rake body and include a finger opening configured to receive a user's fingers therethrough. The rake portion may extend from the distal end of the top rake body to the handle portion and include a plurality of tines. The bottom rake body may have a proximal end and an opposite distal end and may include a mounting portion and a rake portion. The mounting portion may extend from the proximal end of the bottom rake body and be attached to the top rake body. The rake portion may extend from the distal end of the bottom rake body to the mounting portion and include a plurality of tines. The hand guard may be positioned over a top surface of the handle portion and may include a plurality of walls defining an interior space configured to receive the user's hand therein.

In certain embodiments, the bottom rake body may be configured to pivot relative to the top rake body between a closed position in which the tines of the bottom rake body are positioned proximate the tines of the top rake body and an open position in which the tines of the bottom rake body are spaced apart from the tines of the top rake body. The bottom rake body may be pivotally attached to the top rake body via a spring hinge configured to bias the bottom rake body toward the closed position. In certain embodiments, the grabber also may include an actuator attached to the bottom rake body. The actuator may include a finger opening configured to receive one or more of the user's fingers therein such that the user may pull the actuator to move the bottom rake body from the closed position toward the open position.

In certain embodiments, the grabber also may include a top mesh covering attached to the top rake body, and a bottom mesh covering attached to the bottom rake body. The top mesh covering may include a top wall extending over a top surface of the top rake body, a first sidewall extending downward from the top wall along a first side of the top rake body, and a second sidewall extending downward from the top wall along a second side of the top rake body. The bottom mesh covering may include a bottom wall extending under a bottom surface of the bottom rake body, a first sidewall extending upward from the bottom wall along a first side of the bottom rake body, and a second sidewall extending upward from the bottom wall along a second side of the bottom rake body. The bottom rake body and the bottom mesh covering may be positioned between the first sidewall and the second sidewall of the top mesh covering when the bottom rake body is in the closed position, and the bottom rake body and the bottom mesh covering may be vertically spaced apart from the top mesh covering when the bottom rake body is in the open position.

In certain embodiments, the hand guard may include an open proximal end and an opposite, closed distal end, and the plurality of walls of the hand guard may include a front wall, a top wall, a first sidewall, a second sidewall, a first transition wall, and a second transition wall. The front wall may be positioned along the distal end of the hand guard and have a planar or substantially planar shape. The top wall may extend from the proximal end of the hand guard to the front wall and have a planar or substantially planar shape. The first sidewall may extend from the proximal end of the hand guard to the front wall and have a planar or substantially planar shape. The second sidewall may extend from the proximal end of the hand guard to the front wall and have a planar or substantially planar shape. The first transition wall may extend from the proximal end of the hand guard to the front wall and from the first sidewall to the top wall and have a planar or substantially planar shape. The second transition wall may extend from the proximal end of the hand guard to the front wall and from the second sidewall to the top wall and have a planar or substantially planar shape.

According to still another aspect, a paint roller is provided. In one embodiment, the paint roller may include a roller assembly and a hand guard attached to the roller assembly. The roller assembly may have a proximal end and an opposite distal end and include a handle portion and a support portion. The handle portion may extend from the proximal end of the roller assembly and may include a finger opening configured to receive a user's fingers therethrough. The support portion may extend from the distal end of the roller assembly to the handle portion and may include a support arm assembly and a cover support. The support arm assembly may be attached to the handle portion. The cover support may be positioned at the distal end of the roller assembly and rotatably attached to the support arm assembly. The hand guard may be attached to the roller assembly and positioned over a top surface of the handle portion, and the hand guard may include a plurality of walls defining an interior space configured to receive the user's hand therein.

In certain embodiments, the handle portion may include a plurality of tabs, the hand guard may include a plurality of mounting holes, and the hand guard may be attached to the rake body via the tabs received within the mounting holes. In certain embodiments, the handle portion may include a cross-member extending along a width of the rake body and positioned between the first end of the rake body and the finger opening, and the hand rake may include a top grip member positioned on a top surface of the cross-member and a bottom grip member positioned on a bottom surface of the cross-member.

In certain embodiments, the hand guard may include an open proximal end and an opposite, closed distal end, and the plurality of walls of the hand guard may include a front wall, a top wall, a first sidewall, a second sidewall, a first transition wall, and a second transition wall. The front wall may be positioned along the distal end of the hand guard and have a planar or substantially planar shape. The top wall may extend from the proximal end of the hand guard to the front wall and have a planar or substantially planar shape. The first sidewall may extend from the proximal end of the hand guard to the front wall and have a planar or substantially planar shape. The second sidewall may extend from the proximal end of the hand guard to the front wall and have a planar or substantially planar shape. The first transition wall may extend from the proximal end of the hand guard to the front wall and from the first sidewall to the top wall and have a planar or substantially planar shape. The second transition wall may extend from the proximal end of the hand guard to the front wall and from the second sidewall to the top wall and have a planar or substantially planar shape.

In certain embodiments, the support arm assembly may include a first arm attached to the handle portion, and a second arm attached to the cover support. The second arm may be pivotally attached to the first arm via a hinge connection such that an angle between a longitudinal axis of the second arm and a longitudinal axis of the first arm may be selectively adjusted by a user. In certain embodiments, the support arm assembly also may include a lock configured to selectively prevent pivotal movement of the second arm relative to the first arm to maintain the angle between the longitudinal axis of the second arm and the longitudinal axis of the first arm. The lock may include a an outer housing attached to the first arm, an inner cylinder attached to the second arm and positioned within the outer housing, and a fastener extending through the outer housing and the inner cylinder. The inner cylinder may be configured to rotate within the outer housing, and the fastener may be configured to selectively prevent rotation of the inner cylinder relative to the outer housing.

These and other aspects and embodiments of the present disclosure will be apparent or will become apparent to one of ordinary skill in the art upon review of the following detailed description when taken in conjunction with the several drawings and the appended claims.

BRIEF DESCRIPTION OF THE DRAWINGS

In describing the various embodiments of the present disclosure, reference is made to the accompanying drawings, which are not necessarily drawn to scale, and wherein:

FIG. 2D is a side view of the grabber of FIG. 2A held by a user's working hand, showing a bottom rake body of the grabber in a closed position relative to a top rake body of the grabber.

FIG. 2E is a side view of the grabber of FIG. 2A held by the user's working hand, showing the bottom rake body in an open position relative to the top rake body.

FIG. 3A is a perspective view of a hand-operated grabber in accordance with one or more embodiments of the disclosure.

FIG. 3B is a side view of the grabber of FIG. 3A held by a user's working hand, showing a bottom rake body of the grabber in a closed position relative to a top rake body of the grabber.

FIG. 3C is a side view of the grabber of FIG. 3A held by the user's working hand, showing the bottom rake body in an open position relative to the top rake body.

FIG. 5B is a side view of the paint roller of FIG. 5A, showing a support arm assembly of the paint roller in a straight configuration.

FIG. 5C is a side view of the paint roller of FIG. 5A, showing the support arm assembly of the paint roller in an angled configuration.

DETAILED DESCRIPTION OF THE DISCLOSURE

Figure 1A:
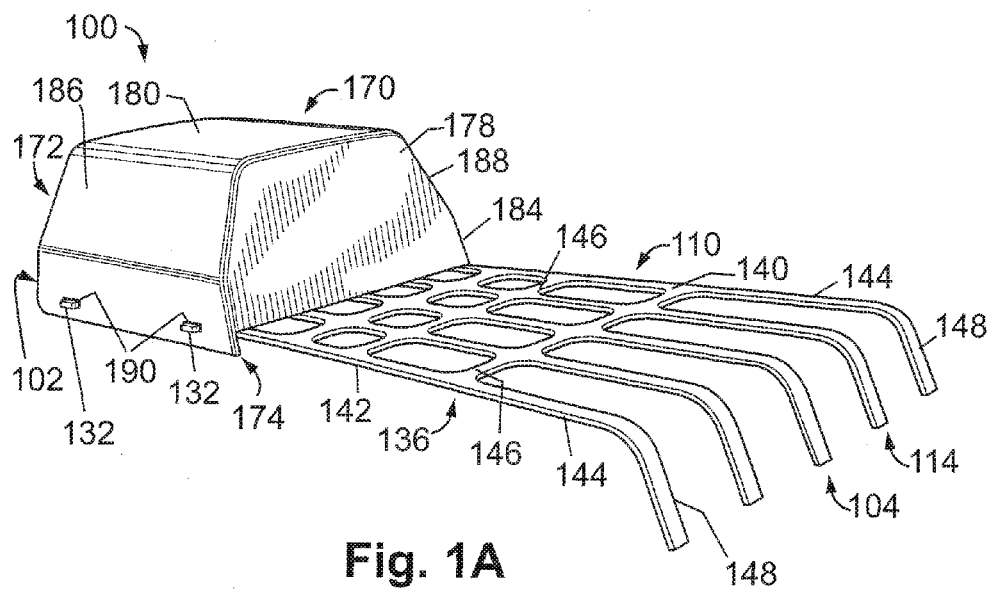
FIG. 1A is a perspective view of a hand rake in accordance with one or more embodiments of the disclosure.
Figures 1B, 1C:
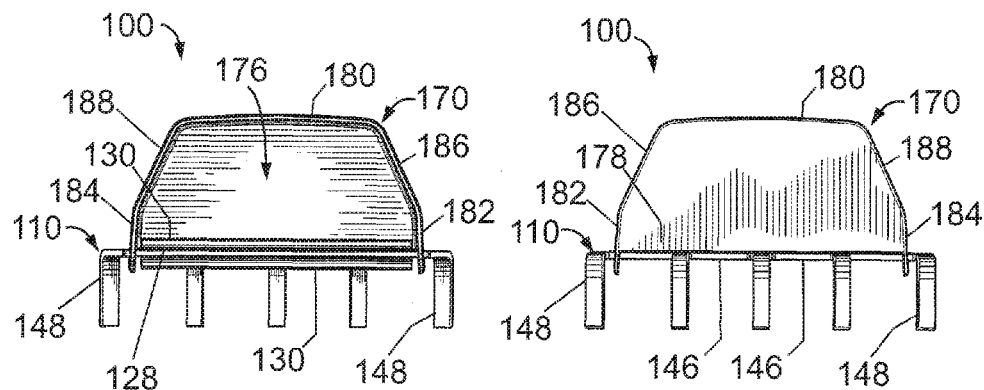
FIG. 1B is a rear view of the hand rake of FIG. 1A.
FIG. 1C is a front view of the hand rake of FIG. 1A.
Figure 1D:
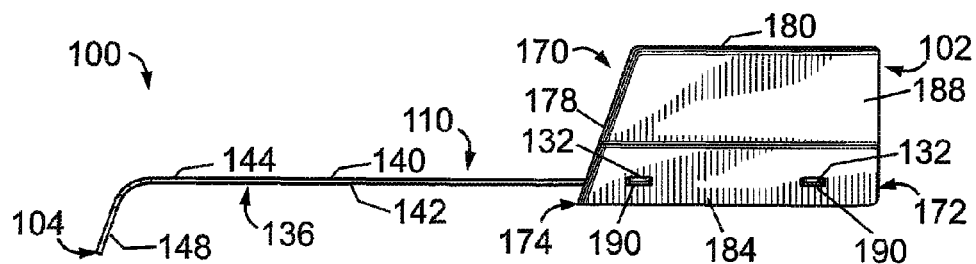
FIG. 1D is a side view of the hand rake of FIG. 1A.
Figure 1E:
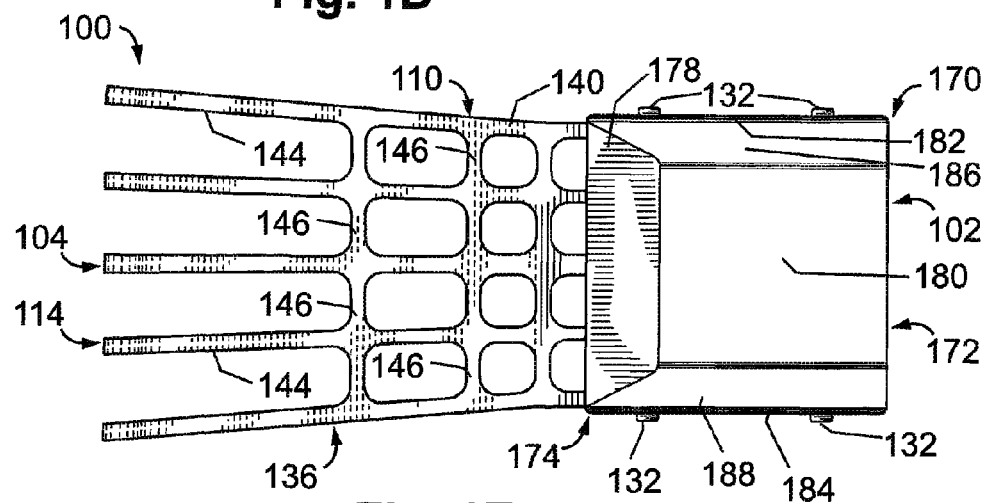
FIG. 1E is a top view of the hand rake of FIG. 1A.
Figure 1F:
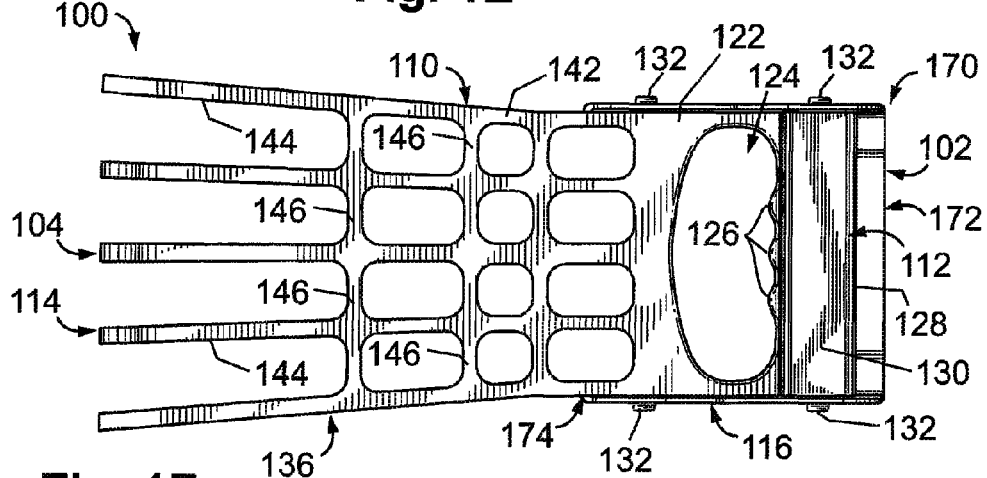
FIG. 1F is a bottom view of the hand rake of FIG. 1A.

Various embodiments of the present disclosure provide improved hand tools for performing gardening, yardwork, or home improvement tasks while protecting a user's working hand from potential harm during use of the tools. In particular, the hand tools disclosed herein may include a hand guard for protecting a user's working hand during use of the tools. In this manner, the disclosed hand tools may address one or more of the above-described problems experienced while using conventional hand tools for gardening, yardwork, or home improvement tasks.

Embodiments of the present disclosure are described herein below with reference to the accompanying drawings, in which some, but not all, embodiments are shown. Indeed, the disclosed hand tools may be embodied in many different forms and should not be construed as limited to the embodiments set forth herein; rather, these embodiments are provided so that this disclosure is thorough and complete and fully conveys the scope of the hand tools to those skilled in the art. Like reference numbers refer to like elements throughout. The singular forms "a," "an," and "the" can refer to plural instances unless the context clearly dictates otherwise or unless explicitly stated.

Referring now to the drawings, FIGS. 1A-1F illustrate a hand rake 100 (which also may be referred to simply as a "hand tool") according to one or more embodiments of the disclosure. As described further below, the hand rake 100 may be configured for tilling soil, gathering garden and yard debris, or collecting other items on the ground, while protecting the user's working hand from potential harm during use of the hand rake 100.

The hand rake 100 may be formed as an elongated structure, as shown, having a first end 102 (which also may be referred to as a "proximal end" or a "user end") and a second end 104 (which also may be referred to as a "distal end" or a "working end"). The hand rake 100 may include a number of components and/or assemblies that are separately formed and attached to one another to form the hand rake 100. In particular, the hand rake 100 may include a rake body 110 (which also may be referred to as a "rake assembly," a "working body," or a "working assembly") and a hand guard 170 (which also may be referred to as a "hand shield," a "safety guard," or a "guard box") which are separately formed and attached to one another. In certain embodiments, the rake body 110 and the hard guard 170 may be fixedly (i.e., permanently) attached to one another. In other embodiments, the rake body 110 and the hand guard 170 may be removably attached to one another, for example, to facilitate cleaning of the hand rake 100 or to allow for modular use of the hand guard 170 with other working bodies or assemblies configured for performing other gardening, yardwork, or home improvement tasks. Further details regarding the attachment of the rake body 110 and the hand guard 170 are described below.

The rake body 110 may be formed as an elongated structure, as shown, having a first end 112 (which also may be referred to as a "proximal end" or a "user end") and a second end 114 (which also may be referred to as a "distal end" or a "working end"). The rake body 110 may include a handle portion 116 (which also may be referred to as a "gripping portion") and a rake portion 136 (which also may be referred to as a "working portion") attached to one another. The handle portion 116 may extend from the first end 112 of the rake body 110 to the rake portion 136, and the rake portion 136 may extend from the second end 114 of the rake body 110 to the handle portion 116. In certain embodiments, as shown, the handle portion 116 and the rake portion 136 may be integrally formed with one another. In other words, the handle portion 116 and the rake portion 136 may be formed as a single component from the same material. In other embodiments, the handle portion 116 and the rake portion 136 may be separately formed and attached, either fixedly or removably, to one another. In certain embodiments, the rake body 110 may be formed of a metal, such as stainless steel, aluminum, or other metals having suitable rigidity and durability for tilling soil, gathering garden and yard debris, or collecting other items on the ground. According to such embodiments, the rake body 110 may be formed from sheet metal that is cut and bent to define the various features of the rake body 110. In other embodiments, the rake body 110 may be formed of a plastic, a composite, or other suitable materials. According to such embodiments, the rake body 110 may be formed by molding or other suitable manufacturing processes to define the various features of the rake body 110.

As shown, the handle portion 116 may include a top surface 120, a bottom surface 122, and one or more finger openings 124 defined in the handle portion 116 and extending from the top surface 120 to the bottom surface 122. In certain embodiments, as shown, the handle portion 116 may be planar or substantially planar in shape, such that the top surface 120 and the bottom surface 122 are planar or substantially planar and arranged parallel to one another. In other embodiments, the handle portion 116 may be contoured (i.e., non-planar) in shape, such that the top surface 120 and the bottom surface 122 are contoured surfaces having a curved or otherwise non-planar shape. In certain embodiments, as shown, the handle portion 116 may include only a single, elongated finger opening 124 configured to receive a user's fingers therethrough. In other embodiments, the handle portion 116 may include two, three, or four separate finger openings 124 each configured to receive one or more of the user's fingers therethrough. According to the illustrated embodiment, the finger opening 124 may have a curved profile for ergonomic support of the user's fingers therein and may include one or more protrusions 126 projecting inward to facilitate gripping during use of the hand rake 100.

The finger opening 124 may be spaced apart from the first end 112 of the rake body 110, as shown, and the handle portion 116 may include a cross-member 128 positioned between the finger opening 124 and the first end 112 and extending along the width of the handle portion 116. When grasped by a user, the cross-member 128 may be held within the user's palm, while the user's fingers extend downward through the finger opening 124 and the user's thumb extends below the cross-member 128. In certain embodiments, the hand rake 100 may include one or more grip members 130 positioned along the cross-member 128 of the handle portion 116. In particular, one grip member 130 may be positioned along the cross-member 128 on the top surface 120 of the handle portion 116, and another grip member 130 may be positioned along the cross-member 128 on the bottom surface 122 of the handle portion 116. This arrangement may provide an improved ergonomic feel when the user grasps the handle portion 116, particularly when the rake body 110 is formed of sheet metal. The grip members 130 may be fixedly attached to the handle portion 116 by one or more adhesives, fasteners, or other suitable means of attachment. In certain embodiments, the grip members 130 may be formed of a compressible material that compresses when the user grasps the handle portion 116 to facilitate secure and comfortable gripping. In other embodiments, the grip members 130 may be formed of a rigid or substantially rigid material, and a layer of compressible material may be positioned between each of the grip members 130 and the cross-member 128. In this manner, the compressible material layers may allow some movement of the grip members 130 when grasped by a user, thereby facilitating secure and comfortable gripping of the handle portion 116.

The handle portion 116 of the rake body 110 may include a plurality of tabs 132 (which also may be referred to simply as "protrusions") extending laterally outward along opposing sides of the handle portion 116, as shown. As described below, the tabs 132 may be configured to facilitate attachment of the rake body 110 to the hand guard 170. In certain embodiments, as shown, the handle portion 116 may include two tabs 132 positioned along one side of the handle portion 116 and two tabs 132 positioned along the opposite side of the handle portion 116. In other embodiments, any number of tabs 132 may be used.

As shown, the rake portion 136 may include a top surface 140, a bottom surface 142, and a number of openings defined in the rake portion 136 and extending from the top surface 140 to the bottom surface 142. In certain embodiments, as shown, a majority of the rake portion 136 may be planar or substantially planar in shape, such that a majority of each of the top surface 140 and the bottom surface 142 are planar or substantially planar and arranged parallel to one another. According to such embodiments, the majority of the rake portion 136 may be coplanar with the handle portion 116, as shown. In other embodiments, a majority of the rake portion 136 may be contoured (i.e., non-planar) in shape, such that the top surface 140 and the bottom surface 142 are contoured surfaces having a curved or otherwise non-planar shape.

As shown, the rake portion 136 may include a plurality of tines 144 and a plurality of cross-members 146 attached to one another. Although the illustrated embodiment includes five tines 144, any number of tines 144 may be used. The tines 144 may be spaced apart from one another by openings and configured for tilling soil, gathering garden and yard debris, or collecting other items on the ground. The cross-members 146 each may extend between adjacent tines 144 and be configured to provide structural support to inhibit deformation of the tines 144 during use of the hand rake 100. As shown, the cross-members 146 each may extend transverse, such as perpendicular, to the longitudinal extent of the tines 144, although other orientations of the cross-members 146 may be used. In certain embodiments, as shown, each of the tines 144 may include a finger 148 that extends downward from a remainder of the tine 144 at an obtuse angle. The angled orientation of the fingers 148 may facilitate tilling of soil and gathering of debris. In certain embodiments, as shown, the tines 144 and the cross-members 146 may be integrally formed with one another. For example, when the rake body 110 is formed from sheet metal, the tines 144 and the cross-members 146 may be formed by removing material between adjacent tines 144 and cross-members 146 and then bending end portions of the tines 144 to form the fingers 148. In this manner, the rake portion 136 may provide a substantially rigid and durable structure for raking. In other embodiments, the tines 144 and the cross-members 146 may be separately formed and fixedly attached to one another to form the rake portion 136.

In certain embodiments, as shown, the rake body 110 may be formed as single component. In other words, the handle portion 116 and the rake portion 136, and the features thereof, may be integrally formed with one another, for example, from sheet metal as described above. In other embodiments, the rake body 110 may be formed as an assembly of separate components and/or subassemblies. In other words, one or more of the handle portion 116, the rake portion 136, and/or the features thereof may be separately formed from the same or different materials and attached to one another to form the rake body 110.

The hand guard 170 may be formed as an elongated, box-like structure, as shown, having a first end 172 (which also may be referred to as a "proximal end" or an "open end") and a second end 174 (which also may be referred to as a "distal end" or a "closed end"). The hand guard 170 may include a plurality of walls defining an interior space 176 therebetween, as shown. In particular, the hand guard 170 may include a front wall 178, a top wall 180, a first sidewall 182, and a second sidewall 184. As shown, the front wall 178 may be positioned along the second end 174 of the hand guard 170, and each of the top wall 180, the first sidewall 182, and the second sidewall 184 may extend from the from the first end 172 to the second end 174 of the hand guard 170 (i.e., from the first end 172 to the front wall 178). In certain embodiments, the hand guard 170 also may include a first transition wall 186 extending from the first sidewall 182 to the top wall 180 and from the from the first end 172 to the second end 174 of the hand guard 170 (i.e., from the first end 172 to the front wall 178), and a second transition wall 188 extending from the second sidewall 184 to the top wall 180 and from the first end 172 to the second end 174 of the hand guard 170 (i.e., from the first end 172 to the front wall 178).

In other embodiments, the transition walls 186, 188 may be omitted, such that the sidewalls 182, 184 extend to the top wall 180. In certain embodiments, as shown, the walls 178, 180, 182, 184, 186, 188 may be integrally formed with one another from the same material. In other embodiments, one or more of the walls 178, 180, 182, 184, 186, 188 may be separately formed and fixedly attached to one another. In certain embodiments, the hand guard 170 may be formed of a plastic having suitable rigidity and durability for withstanding contact with various surrounding objects during use of the hand rake 100. In some such embodiments, the hand guard 170 may be formed by molding, extruding, or other suitable manufacturing processes to define the various features of the hand guard 170. In other embodiments, the hand guard 170 may be formed of a metal, a composite, or other suitable materials. In some such embodiments, the hand guard 170 may be formed from sheet metal that is cut and bent to define the various features of the hand guard 170.

As shown, the walls 178, 180, 182, 184, 186, 188 of the hand guard 170 may be planar or substantially planar in shape, and interfaces between the walls 178, 180, 182, 184, 186, 188 may be rounded or curved to inhibit the hand guard 170 from snagging surrounding objects during use of the hand rake 100. The front wall 178 may be angled relative to the top wall 180 at an obtuse angle, as shown, to provide a user with improved visibility of the rake portion 136 of the rake body 110 and also to guide insertion of the hand guard 170 between surrounding objects during use of the hand rake 100. The transition walls 186, 188 also may be angled relative to the top wall 180 at respective obtuse angles and angled relative to the sidewalls 182, 184 at respective obtuse angles to provide improved visibility and to guide insertion of the hand guard 170 between surrounding objects. The sidewalls 182, 184 may be parallel or substantially parallel to one another, as shown. In other embodiments, one or more or all of the walls 178, 180, 182, 184, 186, 188 may be contoured (i.e., non-planar) in shape, such that the walls 178, 180, 182, 184, 186, 188 define contoured surfaces having a curved or otherwise non-planar shape. The hand guard 170 may include one or more mounting holes 190 defined therein and configured to facilitate attachment of the hand guard 170 to the rake body 110, as described below. In certain embodiments, as shown, the mounting holes 190 may be defined in the sidewalls 182, 184 of the hand guard 170, although other positions of the mounting holes 190 in the hand guard 170 may be used. Although the illustrated embodiment includes two mounting holes 190 defined in the first sidewall 182 and two mounting holes 190 defined in the second sidewall 184, any number of the mounting holes 190 may be used and may be defined in any of the walls 178, 180, 182, 184, 186, 188 of the hand guard 170.

As shown, the rake body 110 and the hand guard 170 may be attached to one another via the tabs 132 and the mounting holes 190. In particular, during assembly of the hand rake 100, the sidewalls 182, 184 of the hand guard 170 may be resiliently deflected away from one another, while the hand guard 170 is positioned over the handle portion 116 of the rake body 110, and then allowed to return to their natural position with respect to one another such that the tabs 132 are received within the mounting holes 190. In this manner, the rake body 110 and the hand guard 170 may be three-dimensionally secured with respect to one another (i.e., constrained in respective X, Y, and Z planes). In certain embodiments, the rake body 110 and the hand guard 170 may be fixedly attached to one another. For example, after positioning the tabs 132 within the mounting holes 190, an adhesive may be applied along interfaces of the handle portion 116 of the rake body 110 and the hand guard 170 to fixedly attach the components to one another, although other means of permanent attachment may be used. In other embodiments, the rake body 110 and the hand guard 170 may be removably attached to one another. For example, the tabs 132 and the mounting holes 190 may be disengaged by resiliently deflecting the sidewalls 182, 184 of the hand guard 170 away from one another and removing the hand guard 170 from the handle portion 116. This removable configuration may facilitate cleaning of the hand rake 100 and also may allow for modular use of the hand guard 170 with other working bodies or assemblies. Although the illustrated embodiment provides the rake body 110 and the hand guard 170 attached to one another via the tabs 132 and the mounting holes 190, it will be appreciated that other types of engagement mechanisms may be used to fixedly or removably attach the rake body 110 and the hand guard 170.

With the hand guard 170 attached to the rake body 110, the hand guard 170 may cover (i.e., be positioned over) and be spaced apart from the top surface 120 of the handle portion 116, while the rake portion 136 extends distally beyond the second end 174 of the hand guard 170, as shown. In certain embodiments, the rake portion 136 may extend distally beyond the second end 174 of the hand guard 170 by at least 4 inches, at least 6 inches, at least 8 inches, at least 10 inches, at least 12 inches, or more. It will be appreciated that the rake portion 136 may come in different sizes having different lengths to provide an ample length for insertion of the tines 144 into dirt, garden or yard debris, or other items being collected, according to various uses. With the hand rake 100 assembled as shown, a user may grasp the handle portion 116 as described above, with the user's palm engaging the cross-member 128 and the top grip member 130, the user's fingers extending through the finger opening 124 and engaging the cross-member 128 and the bottom grip member 130, and the user's thumb extending below and engaging the cross-member 128 and the bottom grip member 130 to securely grasp the hand rake 100. In this manner, a majority of the user's hand may be positioned within the interior space 176 of the hand guard 170, between the handle portion 116 and the hand guard 170, and protected from potential harm during use of the hand rake 100. In certain embodiments, the hand rake 100 also may include a lower guard that is fixedly or removably attached to the rake body 110 or the hand guard 170. For example, the lower guard may include mounting holes, similar to the mounting holes 190 of the hand guard 170, which receive the exposed portions of the tabs 132 (i.e., the portions of the tabs 132 extending outwardly beyond the mounting holes 190) in a similar manner. During use, the lower guard may cover and be spaced apart from the bottom surface 122 of the handle portion 116, such that portions of the user's fingers and thumb are positioned between the lower guard and the handle portion 116. In certain embodiments, the lower guard may be removably attached to the rake portion 110 or the hand guard 170. In this manner, the lower guard may be selectively attached when desired by a user or removed when use of the lower guard is not desired. In other embodiments, the lower guard may be fixedly attached to the rake portion 110 or the hand guard 170 for permanent use.

The hand rake 100 described above may provide several benefits over existing single-handed hand rakes. Most notably, the hand guard 170 may effectively protect the user's working hand from potential harm, such as cuts, scrapes, bites, or stings, when using the hand rake 100 to till soil, gather debris, or collect items on the ground, and may eliminate the need for gloves when performing these tasks. Additionally, the configuration of the hand rake 100 may allow the user to easily grasp the tool in a comfortable and ergonomic manner while keeping the user's working hand protected. Ultimately, the disclosed hand rake 100 provides a simple, durable, low cost, and easy to manufacture and assemble tool for performing gardening and yardwork tasks while removing the worry of potential harm to the user's working hand. It will be appreciated that the hand rake 100 advantageously may be operated with a single hand, while the user's free hand may be used to support the user on or relative to the ground as the user squats, kneels, or is seated on the ground. Because use of the hand rake 100 requires only a single hand, the user may use one hand rake 100 with one hand and another hand rake 100 with the other hand, thereby doubling the user's efficiency in performing desired tasks. It also will be appreciated that the configuration of the hand rake 100 may allow the user to easily grasp the tool with the user's right hand or left hand interchangeably. In this manner, the user may alternate which hand is the working hand, as may be desired when using the hand rake 100 over an extended period of time. Further advantages and benefits of the hand rake 100 over existing hand rakes will be appreciated from the foregoing description.

FIGS. 2A-2E illustrate a hand-operated grabber 200 (which also may be referred to as a "grabber tool," a "pick-up," a "pick-up tool," or simply a "hand tool") according to one or more embodiments of the disclosure. As described further below, the grabber 200 may be configured for picking up a number of items from the ground, instead of simply picking up the items by hand, one-by-one. For example, the grabber 200 may be used to efficiently pick up nuts that have fallen from a tree, although the grabber 200 may be used to pick up various types of items in an efficient manner. It will be appreciated that the grabber 200 may include certain components and features configured in a manner similar to those of the hand rake 100 described above. Corresponding components and features are identified with corresponding reference numbers (i.e., reference numbers beginning with a "2" instead of a "1").

The grabber 200 may be formed as an elongated structure, as shown, having a first end 202 (which also may be referred to as a "proximal end" or a "user end") and a second end 204 (which also may be referred to as a "distal end" or a "working end"). The grabber 200 may include a number of components and/or assemblies that are separately formed and attached to one another to form the grabber 200. In particular, the grabber 200 may include a top rake body 210 (which also may be referred to as a "top rake assembly," a "top working body," or a "top working assembly"), a bottom rake body 250 (which also may be referred to as a "bottom rake assembly," a "bottom working body," or a "bottom working assembly"), and a hand guard 270 (which also may be referred to as a "hand shield," a "safety guard," or a "guard box"), which are separately formed and attached to one another. In certain embodiments, the top rake body 210, the bottom rake body 250, and the hard guard 270 may be fixedly (i.e., permanently) attached to one another. In other embodiments, one or more of the top rake body 210, the bottom rake body 250, and the hard guard 270 may be removably attached to one another, for example, to facilitate cleaning of the grabber 200 or to allow for modular use of the hand guard 270 with other working bodies or assemblies configured for performing other gardening, yardwork, or home improvement tasks. Further details regarding the attachment of the top rake body 210, the bottom rake body 250, and the hard guard 270 are described below.

The top rake body 210 may be formed as an elongated structure, as shown, having a first end 212 (which also may be referred to as a "proximal end" or a "user end") and a second end 214 (which also may be referred to as a "distal end" or a "working end"). The top rake body 210 may include a handle portion 216 (which also may be referred to as a "gripping portion") and a rake portion 236 (which also may be referred to as a "working portion") attached to one another. The handle portion 216 may extend from the first end 212 of the top rake body 210 to the rake portion 236, and the rake portion 236 may extend from the second end 214 of the top rake body 210 to the handle portion 216. In certain embodiments, as shown, the handle portion 216 and the rake portion 236 may be integrally formed with one another. In other words, the handle portion 216 and the rake portion 236 may be formed as a single component from the same material. In other embodiments, the handle portion 216 and the rake portion 236 may be separately formed and attached, either fixedly or removably, to one another. In certain embodiments, the top rake body 210 may be formed of a metal, such as stainless steel, aluminum, or other metals having suitable rigidity and durability for picking up items from the ground. According to such embodiments, the top rake body 210 may be formed from sheet metal that is cut and bent to define the various features of the top rake body 210. In other embodiments, the top rake body 210 may be formed of a plastic, a composite, or other suitable materials. According to such embodiments, the top rake body 210 may be formed by molding or other suitable manufacturing processes to define the various features of the top rake body 210.

As shown, the handle portion 216 may include a top surface 220, a bottom surface 222, and one or more finger openings 224 defined in the handle portion 216 and extending from the top surface 220 to the bottom surface 222. In certain embodiments, as shown, the handle portion 216 may be planar or substantially planar in shape, such that the top surface 220 and the bottom surface 222 are planar or substantially planar and arranged parallel to one another. In other embodiments, the handle portion 216 may be contoured (i.e., non-planar) in shape, such that the top surface 220 and the bottom surface 222 are contoured surfaces having a curved or otherwise non-planar shape. In certain embodiments, as shown, the handle portion 216 may include only a single, elongated finger opening 224 configured to receive a user's fingers therethrough. In other embodiments, the handle portion 216 may include two, three, or four separate finger openings 224 each configured to receive one or more of the user's fingers therethrough. According to the illustrated embodiment, the finger opening 224 may have a curved profile for ergonomic support of the user's fingers therein and may include one or more protrusions 226 projecting inward to facilitate gripping during use of the grabber 200.

The finger opening 224 may be spaced apart from the first end 212 of the top rake body 210, as shown, and the handle portion 216 may include a cross-member 228 positioned between the finger opening 224 and the first end 212 and extending along the width of the handle portion 216. When grasped by a user, the cross-member 228 may be held within the user's palm, while the user's fingers extend downward through the finger opening 224 and the user's thumb extends below the cross-member 228. In certain embodiments, the grabber 200 may include one or more grip members 230 positioned along the cross-member 228 of the handle portion 216. In particular, one grip member 230 may be positioned along the cross-member 228 on the top surface 220 of the handle portion 216, and another grip member 230 may be positioned along the cross-member 228 on the bottom surface 222 of the handle portion 216. This arrangement may provide an improved ergonomic feel when the user grasps the handle portion 216, particularly when the top rake body 210 is formed of sheet metal. The grip members 230 may be fixedly attached to the handle portion 216 by one or more adhesives, fasteners, or other suitable means of attachment. In certain embodiments, the grip members 230 may be formed of a compressible material that compresses when the user grasps the handle portion 216 to facilitate secure and comfortable gripping. In other embodiments, the grip members 230 may be formed of a rigid or substantially rigid material, and a layer of compressible material may be positioned between each of the grip members 230 and the cross-member 228. In this manner, the compressible material layers may allow some movement of the grip members 230 when grasped by a user, thereby facilitating secure and comfortable gripping of the handle portion 216.

The handle portion 216 of the top rake body 210 may include a plurality of tabs 232 (which also may be referred to simply as "protrusions") extending laterally outward along opposing sides of the handle portion 216, as shown. As described below, the tabs 232 may be configured to facilitate attachment of the top rake body 210 to the hand guard 270. In certain embodiments, as shown, the handle portion 216 may include two tabs 232 positioned along one side of the handle portion 216 and two tabs 232 positioned along the opposite side of the handle portion 216. In other embodiments, any number of tabs 232 may be used. The handle portion 216 of the top rake body 210 also may include a plurality of mounting holes 234 extending therethrough, as shown. The mounting holes 234 may be positioned near but spaced apart from the finger opening 224. As described below, the mounting holes 234 may be configured to facilitate attachment of the top rake body 210 to the bottom rake body 250. In certain embodiments, as shown, the handle portion 216 may include three mounting holes 234 defined therein. In other embodiments, any number of mounting holes 234 may be used.

As shown, the rake portion 236 may include a top surface 240, a bottom surface 242, and a number of openings defined in the rake portion 236 and extending from the top surface 240 to the bottom surface 242. In certain embodiments, as shown, a majority of the rake portion 236 may be planar or substantially planar in shape, such that a majority of each of the top surface 240 and the bottom surface 242 are planar or substantially planar and arranged parallel to one another. According to such embodiments, the majority of the rake portion 236 may be coplanar with the handle portion 216, as shown. In other embodiments, a majority of the rake portion 236 may be contoured (i.e., non-planar) in shape, such that the top surface 240 and the bottom surface 242 are contoured surfaces having a curved or otherwise non-planar shape.

As shown, the rake portion 236 may include a plurality of tines 244 and a plurality of cross-members 246 attached to one another. Although the illustrated embodiment includes five tines 244, any number of tines 244 may be used. The tines 244 may be spaced apart from one another by openings and configured for grasping and picking up items from the ground. The cross-members 246 each may extend between adjacent tines 244 and be configured to provide structural support to inhibit deformation of the tines 244 during use of the grabber 200. As shown, the cross-members 246 each may extend transverse, such as perpendicular, to the longitudinal extent of the tines 244, although other orientations of the cross-members 246 may be used. In certain embodiments, as shown, each of the tines 244 may include a finger 248 that extends downward from a remainder of the tine 244 at an obtuse angle. The angled orientation of the fingers 248 may facilitate grasping and retaining items picked up from the ground. In certain embodiments, as shown, the tines 244 and the cross-members 246 may be integrally formed with one another. For example, when the top rake body 210 is formed from sheet metal, the tines 244 and the cross-members 246 may be formed by removing material between adjacent tines 244 and cross-members 246 and then bending end portions of the tines 244 to form the fingers 248. In this manner, the rake portion 236 may provide a substantially rigid and durable structure for grasping and retaining items. In other embodiments, the tines 244 and the cross-members 246 may be separately formed and fixedly attached to one another to form the rake portion 236.

In certain embodiments, as shown, the top rake body 210 may be formed as single component. In other words, the handle portion 216 and the rake portion 236, and the features thereof, may be integrally formed with one another, for example, from sheet metal as described above. In other embodiments, the top rake body 210 may be formed as an assembly of separate components and/or subassemblies. In other words, one or more of the handle portion 216, the rake portion 236, and/or the features thereof may be separately formed from the same or different materials and attached to one another to form the top rake body 210.

The bottom rake body 250 may be formed as an elongated structure, as shown, having a first end 252 (which also may be referred to as a "proximal end" or a "user end") and a second end 254 (which also may be referred to as a "distal end" or a "working end"). The bottom rake body 250 may include a mounting portion 255 (which also may be referred to as an "attachment portion") and a rake portion 256 (which also may be referred to as a "working portion") attached to one another. The mounting portion 255 may extend from the first end 252 of the bottom rake body 250 to the rake portion 256, and the rake portion 256 may extend from the second end 254 of the bottom rake body 250 to the mounting portion 255. In certain embodiments, as shown, the mounting portion 255 and the rake portion 256 may be integrally formed with one another. In other words, the mounting portion 255 and the rake portion 256 may be formed as a single component from the same material. In other embodiments, the mounting portion 255 and the rake portion 256 may be separately formed and attached, either fixedly or removably, to one another. In certain embodiments, the bottom rake body 250 may be formed of a metal, such as stainless steel, aluminum, or other metals having suitable rigidity and durability for picking up items from the ground. According to such embodiments, the bottom rake body 250 may be formed from sheet metal that is cut and bent to define the various features of the bottom rake body 250. In other embodiments, the bottom rake body 250 may be formed of a plastic, a composite, or other suitable materials. According to such embodiments, the bottom rake body 250 may be formed by molding or other suitable manufacturing processes to define the various features of the bottom rake body 250.

The mounting portion 255 of the bottom rake body 250 may include a plurality of mounting holes 258 extending therethrough, as shown. The mounting holes 258 may be positioned near but spaced apart from the first end 252 of the bottom rake body 250. As described below, the mounting holes 258 may be configured to facilitate attachment of the bottom rake body 250 to the top rake body 210. In certain embodiments, as shown, the mounting portion 255 may include three mounting holes 258 defined therein. In other embodiments, any number of mounting holes 258 may be used.

As shown, the rake portion 256 may include a top surface 260, a bottom surface 262, and a number of openings defined in the rake portion 256 and extending from the top surface 260 to the bottom surface 262. In certain embodiments, as shown, a majority of the rake portion 256 may be planar or substantially planar in shape, such that a majority of each of the top surface 260 and the bottom surface 262 are planar or substantially planar and arranged parallel to one another. In other embodiments, a majority of the rake portion 256 may be contoured (i.e., non-planar) in shape, such that the top surface 260 and the bottom surface 262 are contoured surfaces having a curved or otherwise non-planar shape.

As shown, the rake portion 256 may include a plurality of tines 264 and a plurality of cross-members 266 attached to one another. Although the illustrated embodiment includes four tines 264, any number of tines 264 may be used. The tines 264 may be spaced apart from one another by openings and configured for grasping and picking up items from the ground. The cross-members 266 each may extend between adjacent tines 264 and be configured to provide structural support to inhibit deformation of the tines 264 during use of the grabber 200. As shown, the cross-members 266 each may extend transverse, such as perpendicular, to the longitudinal extent of the tines 264, although other orientations of the cross-members 266 may be used. In certain embodiments, as shown, each of the tines 264 may include a finger 268 that extends upward from a remainder of the tine 264 at an obtuse angle. The angled orientation of the fingers 268 may facilitate grasping and retaining items picked up from the ground. In certain embodiments, as shown, the tines 264 and the cross-members 266 may be integrally formed with one another. For example, when the bottom rake body 250 is formed from sheet metal, the tines 264 and the cross-members 266 may be formed by removing material between adjacent tines 264 and cross-members 266 and then bending end portions of the tines 264 to form the fingers 268. In this manner, the rake portion 256 may provide a substantially rigid and durable structure for grasping and retaining items. In other embodiments, the tines 264 and the cross-members 266 may be separately formed and fixedly attached to one another to form the rake portion 256.

In certain embodiments, as shown, the bottom rake body 250 may be formed as single component. In other words, the mounting portion 255 and the rake portion 256, and the features thereof, may be integrally formed with one another, for example, from sheet metal as described above. In other embodiments, the bottom rake body 250 may be formed as an assembly of separate components and/or subassemblies. In other words, one or more of the mounting portion 255, the rake portion 256, and/or the features thereof may be separately formed from the same or different materials and attached to one another to form the bottom rake body 250.

The hand guard 270 may be formed as an elongated, box-like structure, as shown, having a first end 272 (which also may be referred to as a "proximal end" or an "open end") and a second end 274 (which also may be referred to as a "distal end" or a "closed end"). The hand guard 270 may include a plurality of walls defining an interior space 276 therebetween, as shown. In particular, the hand guard 270 may include a front wall 278, a top wall 280, a first sidewall 282, and a second sidewall 284. As shown, the front wall 278 may be positioned along the second end 274 of the hand guard 270, and each of the top wall 280, the first sidewall 282, and the second sidewall 284 may extend from the from the first end 272 to the second end 274 of the hand guard 270 (i.e., from the first end 272 to the front wall 278). In certain embodiments, the hand guard 270 also may include a first transition wall 286 extending from the first sidewall 282 to the top wall 280 and from the from the first end 272 to the second end 274 of the hand guard 270 (i.e., from the first end 272 to the front wall 278), and a second transition wall 288 extending from the second sidewall 284 to the top wall 280 and from the first end 272 to the second end 274 of the hand guard 270 (i.e., from the first end 272 to the front wall 278). In other embodiments, the transition walls 286, 288 may be omitted, such that the sidewalls 282, 284 extend to the top wall 280. In certain embodiments, as shown, the walls 278, 280, 282, 284, 286, 288 may be integrally formed with one another from the same material. In other embodiments, one or more of the walls 278, 280, 282, 284, 286, 288 may be separately formed and fixedly attached to one another. In certain embodiments, the hand guard 270 may be formed of a plastic having suitable rigidity and durability for withstanding contact with various surrounding objects during use of the grabber 200. In some such embodiments, the hand guard 270 may be formed by molding, extruding, or other suitable manufacturing processes to define the various features of the hand guard 270. In other embodiments, the hand guard 270 may be formed of a metal, a composite, or other suitable materials. In some such embodiments, the hand guard 270 may be formed from sheet metal that is cut and bent to define the various features of the hand guard 270.

As shown, the walls 278, 280, 282, 284, 286, 288 of the hand guard 270 may be planar or substantially planar in shape, and interfaces between the walls 278, 280, 282, 284, 286, 288 may be rounded or curved to inhibit the hand guard 270 from snagging surrounding objects during use of the grabber 200. The front wall 278 may be angled relative to the top wall 280 at an obtuse angle, as shown, to provide a user with improved visibility of the rake portions 236, 256 of the rake bodies 210, 250 and also to guide insertion of the hand guard 270 between surrounding objects during use of the grabber 200. The transition walls 286, 288 also may be angled relative to the top wall 280 at respective obtuse angles and angled relative to the sidewalls 282, 284 at respective obtuse angles to provide improved visibility and to guide insertion of the hand guard 270 between surrounding objects. The sidewalls 282, 284 may be parallel or substantially parallel to one another, as shown. In other embodiments, one or more or all of the walls 278, 280, 282, 284, 286, 288 may be contoured (i.e., non-planar) in shape, such that the walls 278, 280, 282, 284, 286, 288 define contoured surfaces having a curved or otherwise non-planar shape. The hand guard 270 may include one or more mounting holes 290 defined therein and configured to facilitate attachment of the hand guard 270 to the top rake body 210, as described below. In certain embodiments, as shown, the mounting holes 290 may be defined in the sidewalls 282, 284 of the hand guard 270, although other positions of the mounting holes 290 in the hand guard 270 may be used. Although the illustrated embodiment includes two mounting holes 290 defined in the first sidewall 282 and two mounting holes 290 defined in the second sidewall 284, any number of the mounting holes 290 may be used and may be defined in any of the walls 278, 280, 282, 284, 286, 288 of the hand guard 270.

As shown, the top rake body 210 and the hand guard 270 may be attached to one another via the tabs 232 and the mounting holes 290. In particular, during assembly of the grabber 200, the sidewalls 282, 284 of the hand guard 270 may be resiliently deflected away from one another, while the hand guard 270 is positioned over the handle portion 216 of the top rake body 210, and then allowed to return to their natural position with respect to one another such that the tabs 232 are received within the mounting holes 290. In this manner, the top rake body 210 and the hand guard 270 may be three-dimensionally secured with respect to one another (i.e., constrained in respective X, Y, and Z planes). In certain embodiments, the top rake body 210 and the hand guard 270 may be fixedly attached to one another. For example, after positioning the tabs 232 within the mounting holes 290, an adhesive may be applied along interfaces of the handle portion 216 of the top rake body 210 and the hand guard 270 to fixedly attach the components to one another, although other means of permanent attachment may be used. In other embodiments, the top rake body 210 and the hand guard 270 may be removably attached to one another. For example, the tabs 232 and the mounting holes 290 may be disengaged by resiliently deflecting the sidewalls 282, 284 of the hand guard 270 away from one another and removing the hand guard 270 from the handle portion 216. This removable configuration may facilitate cleaning of the grabber 200 and also may allow for modular use of the hand guard 270 with other working bodies or assemblies. Although the illustrated embodiment provides the top rake body 210 and the hand guard 270 attached to one another via the tabs 232 and the mounting holes 290, it will be appreciated that other types of engagement mechanisms may be used to fixedly or removably attach the top rake body 210 and the hand guard 270.

Figure 2A:
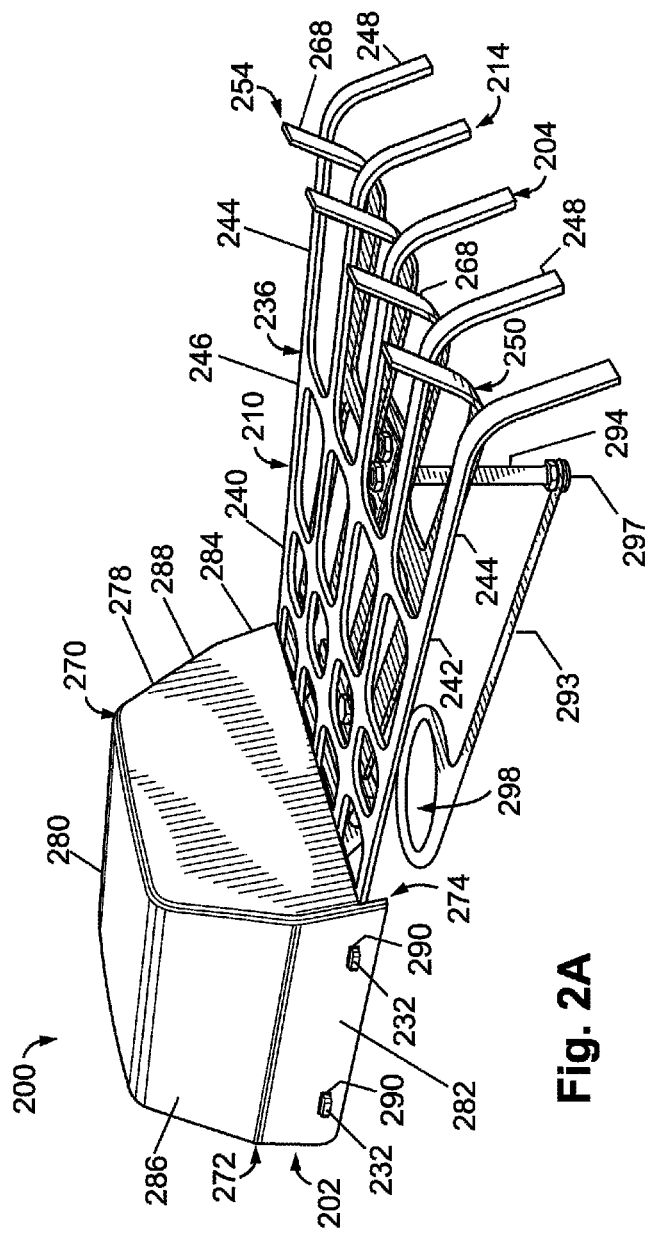
FIG. 2A is a perspective view of a hand-operated grabber in accordance with one or more embodiments of the disclosure.
Figure 2B:
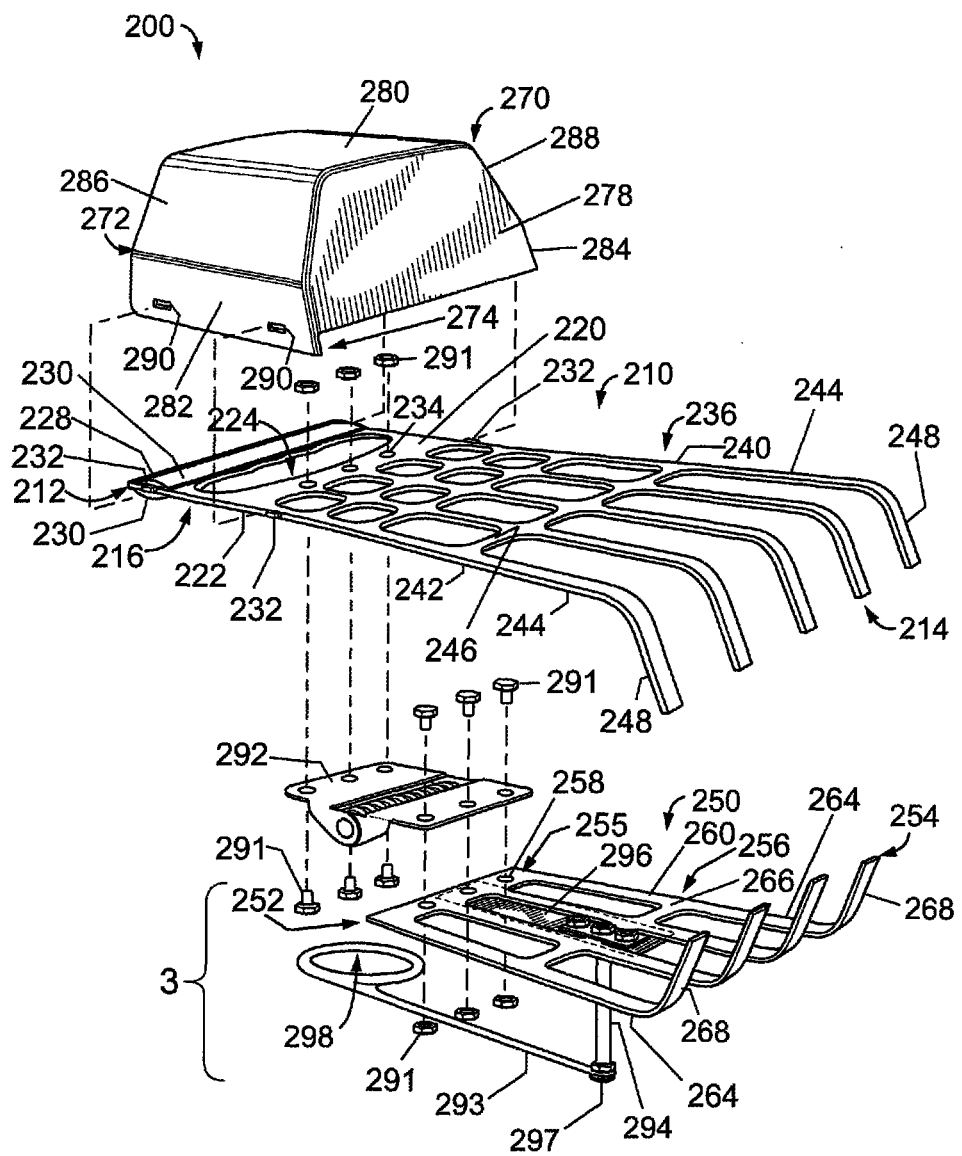
FIG. 2B is an exploded perspective view of the grabber of FIG. 2A.
Figure 2C:
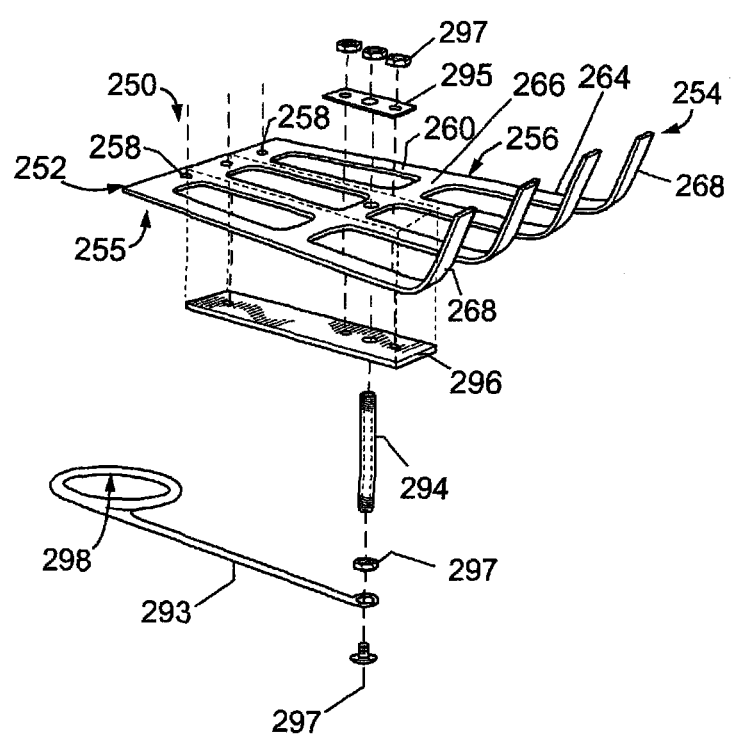
FIG. 2C is an exploded perspective view of a portion of the grabber of FIG. 2A.
Figure 4A:
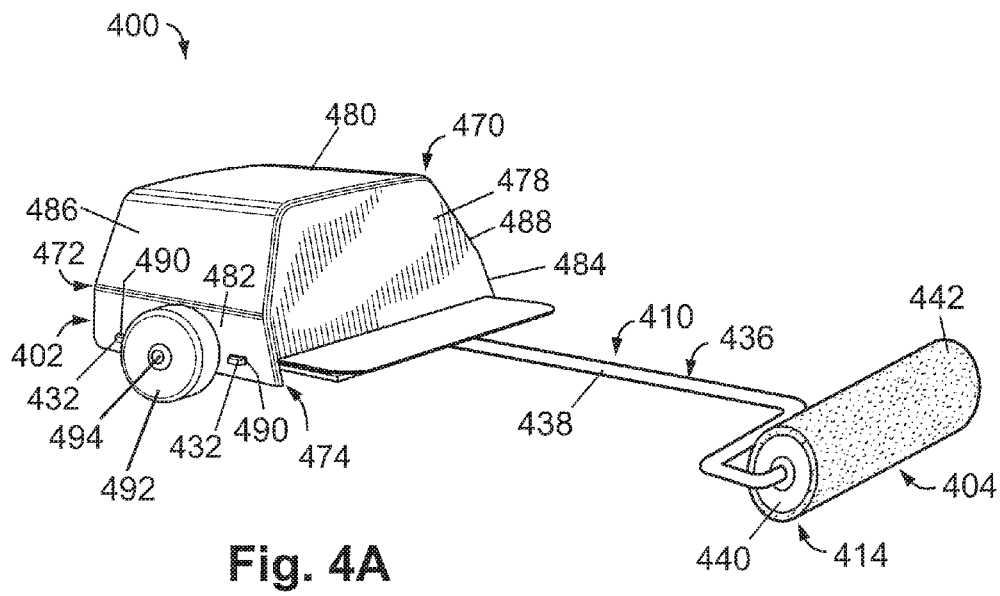
FIG. 4A is a perspective view of a hand-operated paint roller in accordance with one or more embodiments of the disclosure.
Figures 4B, 4C:
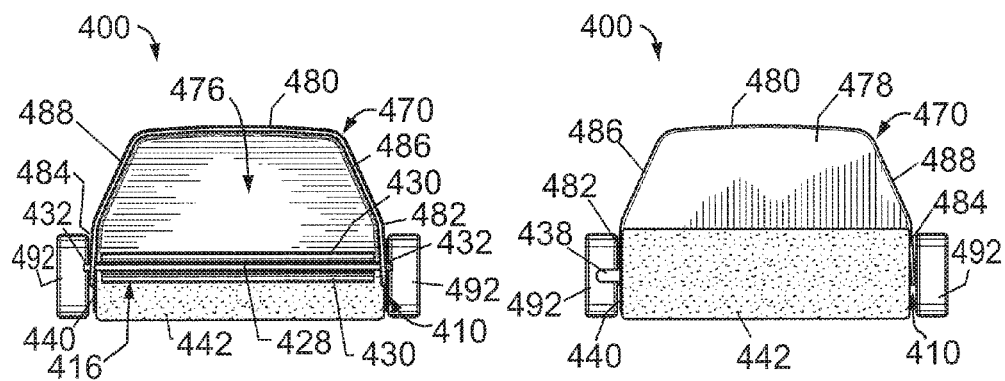
FIG. 4B is a rear view of the paint roller of FIG. 4A.
FIG. 4C is a front view of the paint roller of FIG. 4A.
Figure 4D:
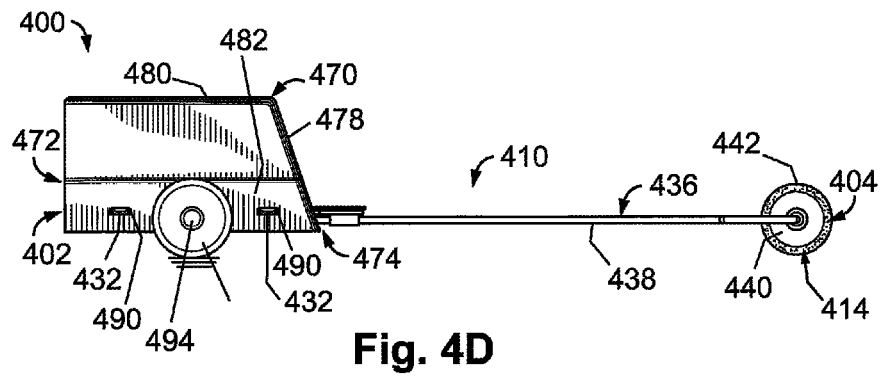
FIG. 4D is a side view of the paint roller of FIG. 4A.
Figure 4E:
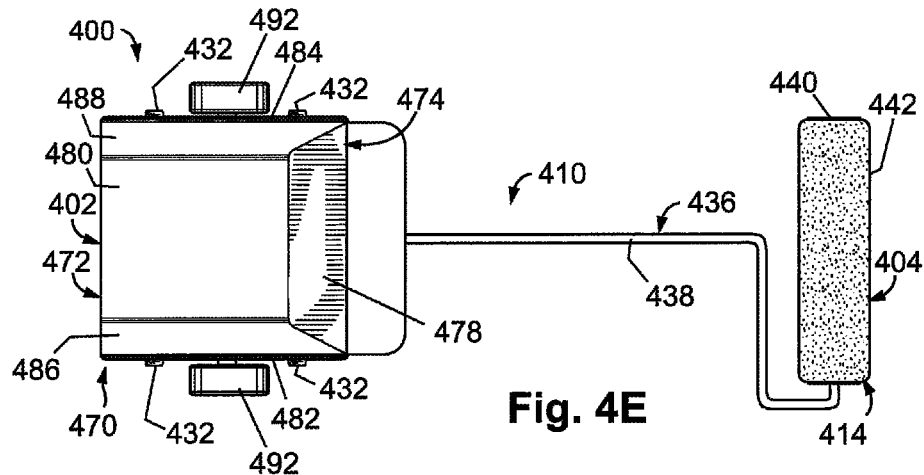
FIG. 4E is a top view of the paint roller of FIG. 4A.
Figure 4F:
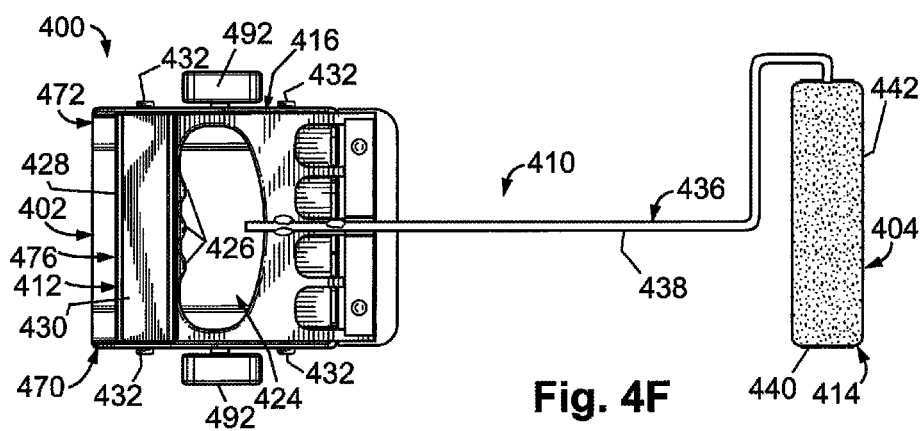
FIG. 4F is a bottom view of the paint roller of FIG. 4A.

As shown, the top rake body 210 and the bottom rake body 250 may be attached to one another via the mounting holes 234, 258, a plurality of fasteners 291, and a spring hinge 292. In certain embodiments, as shown, the fasteners 291 may include screws and nuts, although other types of mechanical fasteners may be used. In other embodiments, the rake bodies 210, 250 and the spring hinge 292 may be attached to one another via other fastening means, such as an adhesive, welding, or soldering. As shown, a first plurality of the fasteners 291 may extend through the mounting holes 234 of the handle portion 216 of the top rake body 210 and through corresponding holes in the spring hinge 292 to securely attach the top rake body 210 to the spring hinge 292. In a similar manner, a second plurality of the fasteners 291 may extend through the mounting holes 258 of the mounting portion 255 of the bottom rake body 250 and through corresponding holes in the spring hinge 292 to securely attach the bottom rake body 250 to the spring hinge 292. With the top rake body 210 and the bottom rake body 250 attached to one another via the spring hinge 292, the rake bodies 210, 250 may be movable relative to one another. In particular, the bottom rake body 250 may be pivotable about a rotational axis of the spring hinge 292 between a closed position, as shown in FIGS. 2A and 2D, and an open position, as shown in FIG. 2E. When the bottom rake body 250 is in the open position, the tines 244, 264 of the rake bodies 210, 250 may be spaced apart from one another for allowing items to be received therebetween. When the bottom rake body 250 is in the closed position, the tines 244, 264 of the rake bodies 210, 250 may be positioned proximate one another for retaining the received items therebetween. In certain embodiments, portions of the tines 264 of the bottom rake body 250 may mesh or interdigitate with (i.e., be positioned between) portions of respective tines 244 of the top rake body 210, as shown. In certain embodiments, as shown, the spring hinge 292 may be configured to bias the bottom rake body 250 toward the closed position relative to the top rake body 210.

As shown, the grabber 200 also may include an actuator 293 to facilitate selective movement of the bottom rake body 250 from the closed position to the open position relative to the top rake body 210. The actuator 293 may be formed as an elongated arm positioned below and attached to the bottom rake body 250. In certain embodiments, as shown, the actuator 293 may be attached to the bottom rake body 250 via a connector 294, a top mounting plate 295, a bottom mounting plate 296, and a plurality of fasteners 297, although other attachment means may be used. The connector 294 may be formed as an elongated bar or member extending downward between the bottom rake body 250 and the actuator 293. In certain embodiments, as shown, the fasteners 297 may include screws and/or nuts that securely attach the bottom rake body 250, the actuator 293, the connector 294, and the mounting plates 295, 296 to one another. In other embodiments, the fasteners 297 may include other types of mechanical fasteners. In certain embodiments, the connector 294 may be omitted, and the actuator 293 may be attached to the bottom rake body 250 via the mounting plates 295, 296 and the fasteners 297. As shown, the actuator 293 may include one or more finger openings 298 defined therein and configured to allow one or more of the user's fingers to extend therethough. In certain embodiments, as shown, the actuator 293 may include only a single finger opening 298, although multiple finger openings 298 may be used in other embodiments. As shown in FIGS. 2D and 2E, the user may move the actuator 293 by pulling the actuator 293 proximally with one or more of the user's fingers positioned within the finger opening 298, thereby overcoming the biasing force of the spring hinge 292 and causing the bottom rake body 250 to move from the closed position toward the open position relative to the top rake body 210. When the user releases such pulling force, the biasing force of the spring hinge 292 may cause the bottom rake body 250 to return to the closed position relative to the top rake body 210.

With the hand guard 270 attached to the top rake body 210, the hand guard 270 may cover (i.e., be positioned over) and be spaced apart from the top surface 220 of the handle portion 216, while the rake portions 236, 256 extend distally beyond the second end 274 of the hand guard 270, as shown. In certain embodiments, the rake portions 236, 256 may extend distally beyond the second end 274 of the hand guard 270 by at least 4 inches, at least 6 inches, at least 8 inches, at least 10 inches, at least 12 inches, or more. It will be appreciated that the rake portions 236, 256 may come in different sizes having different lengths to provide an ample length for insertion of the tines 244, 264 between surrounding objects to pick up desired items, according to various uses. With the grabber 200 assembled as shown, a user may grasp the handle portion 216 as described above, with the user's palm engaging the cross-member 228 and the top grip member 230, the user's fingers extending through the finger opening 224 and engaging the cross-member 228 and the bottom grip member 230, and the user's thumb extending below and engaging the cross-member 228 and the bottom grip member 230 to securely grasp the grabber 200. In this manner, a majority of the user's hand may be positioned within the interior space 276 of the hand guard 270, between the handle portion 216 and the hand guard 270, and protected from potential harm during use of the grabber 200. Meanwhile, one or more of the user's fingers may extend through the finger opening 298 of the actuator 293 to allow the user to easily move the bottom rake body 250 between the closed position and the open position for picking up desired items and then releasing the items from the grabber 200.

The grabber 200 described above may provide several benefits over existing single-handed grabbers. Most notably, the hand guard 270 may effectively protect the user's working hand from potential harm, such as cuts, scrapes, bites, or stings, when using the grabber 200 to pick up items from the ground, and may eliminate the need for gloves when performing these tasks. Additionally, the configuration of the grabber 200 may allow the user to easily grasp and actuate the tool in a comfortable and ergonomic manner while keeping the user's working hand protected. Ultimately, the disclosed grabber 200 provides a simple, durable, low cost, and easy to manufacture and assemble tool for performing gardening and yardwork tasks while removing the worry of potential harm to the user's working hand. It will be appreciated that the grabber 200 advantageously may be operated with a single hand, while the user's free hand may be used to support the user on or relative to the ground as the user squats, kneels, or is seated on the ground. Because use of the grabber 200 requires only a single hand, the user may use one grabber 200 with one hand and another grabber 200 with the other hand, thereby doubling the user's efficiency in performing desired tasks. It also will be appreciated that the configuration of the grabber 200 may allow the user to easily grasp the tool with the user's right hand or left hand interchangeably. In this manner, the user may alternate which hand is the working hand, as may be desired when using the grabber 200 over an extended period of time. Finally, it will be appreciated that, in certain embodiments, the bottom rake body 250 and the actuator 293 may be removed from the top rake body 210. Consequently, the remaining portions of the grabber 200 may be used as a hand rake in a manner similar to that described above with respect to the hand rake 100. Further advantages and benefits of the grabber 200 over existing grabbers will be appreciated from the foregoing description.

FIGS. 3A-3C illustrate a hand-operated grabber 300 (which also may be referred to as a "grabber tool," a "pick-up," a "pick-up tool," or simply a "hand tool") according to one or more embodiments of the disclosure. As described further below, the grabber 300 may be configured for picking up a number of items from the ground, instead of simply picking up the items by hand, one-by-one. For example, the grabber 300 may be used to efficiently pick up nuts that have fallen from a tree, although the grabber 300 may be used to pick up various types of items in an efficient manner. It will be appreciated that the grabber 300 may include certain components and features configured in a manner similar to those of the grabber 200 described above. Identical components and features are identified with the same reference numbers (i.e., reference numbers beginning with a "2") and perform the same functions described above with respect to the grabber 200. Different components and features are identified with reference numbers beginning with a "3" and their functions are described below.

As shown, the grabber 300 may include a top mesh covering 310 attached to the top rake body 210, and a bottom mesh covering 350 attached to the bottom rake body 250. In particular, the top mesh covering 310 may be supported by a top frame 312 attached, either fixedly or removably, to the top rake body 210, and the bottom mesh covering 350 may be supported by a bottom frame 352 attached, either fixedly or removably, to the bottom rake body 250. The top mesh covering 310 may include a top wall 314 extending over the top surface 240 of the rake portion 236 of the top rake body 210, a first sidewall 316 extending downward along the first side of the rake portion 236, and a second sidewall 318 extending downward along the second side of the rake portion 236. In a similar manner, the bottom mesh covering 350 may include a bottom wall 354 extending under the bottom surface 262 of the rake portion 256 of the bottom rake body 250, a first sidewall 356 extending upward along the first side of the rake portion 256, and a second sidewall 358 extending upward along the second side of the rake portion 256.

The top mesh covering 310 and the bottom mesh covering 350 each may be formed as a screened structure include a plurality of openings defined therein. In certain embodiments, as shown, the top mesh covering 310 and the bottom mesh covering 350 each may include a plurality of wires arranged in an overlapping pattern and defining the plurality of openings therebetween. For example, the wires may be woven in an overlapping pattern. It will be appreciated that the density of the wires and the size of the openings may be selected depending on the type of items to be picked up using the grabber 300. In certain embodiments, the mesh coverings 310, 350 may be formed of a rigid or substantially rigid material, although flexible materials may be used in other embodiments. In certain embodiments, the mesh coverings 310, 350 may be formed of a metal, although a plastic, a composite, or other suitable materials may be used in other embodiments.

When the bottom rake body 250 of the grabber 300 is in the closed position, as shown in FIG. 3B, the bottom rake body 250 and the bottom mesh covering 350 may be positioned between the sidewalls 316, 318 of the top mesh covering 310. In this manner, the mesh coverings 310, 350 may aid in retaining items between the rake bodies 210, 250, particularly smaller items having a maximum dimension that is less than a maximum dimension of the openings between adjacent tines 244, 264 but greater than a maximum dimension of the openings in the mesh coverings 310, 350. The sidewalls 316, 318, 356, 358 of the mesh coverings 310, 350 also may aid in retaining items that otherwise might escape laterally from between the rake bodies 210, 250. When the bottom rake body 250 of the grabber 300 is in the open position, as shown in FIG. 3C, the bottom rake body 250 and the bottom mesh covering 350 may be vertically spaced apart from the top rake body 210 and the top mesh covering 310 (i.e., the bottom rake body 250 and the bottom mesh covering 350 are not positioned between the sidewalls 316, 318 of the top mesh covering 310). In this manner, the rake bodies 210, 250 and the mesh coverings 310, 350 may easily receive items therebetween when the bottom rake body 250 of the grabber 300 is in the open position.

The grabber 300 described above may provide several benefits over existing single-handed grabbers. Most notably, the hand guard 270 may effectively protect the user's working hand from potential harm, such as cuts, scrapes, bites, or stings, when using the grabber 300 to pick up items from the ground, and may eliminate the need for gloves when performing these tasks. Additionally, the configuration of the grabber 300 may allow the user to easily grasp and actuate the tool in a comfortable and ergonomic manner while keeping the user's working hand protected. Ultimately, the disclosed grabber 300 provides a simple, durable, low cost, and easy to manufacture and assemble tool for performing gardening and yardwork tasks while removing the worry of potential harm to the user's working hand. It will be appreciated that the grabber 300 advantageously may be operated with a single hand, while the user's free hand may be used to support the user on or relative to the ground as the user squats, kneels, or is seated on the ground. Because use of the grabber 300 requires only a single hand, the user may use one grabber 300 with one hand and another grabber 300 with the other hand, thereby doubling the user's efficiency in performing desired tasks. It also will be appreciated that the configuration of the grabber 300 may allow the user to easily grasp the tool with the user's right hand or left hand interchangeably. In this manner, the user may alternate which hand is the working hand, as may be desired when using the grabber 300 over an extended period of time. Moreover, the mesh coverings 310, 350 may allow the grabber 300 to pick up and retain smaller items that could not be picked up and/or retained using existing single-handed grabbers. Further advantages and benefits of the grabber 300 over existing grabbers will be appreciated from the foregoing description.

FIGS. 4A-4F illustrate a hand-operated paint roller 400 (which also may be referred to as simply a "hand tool") according to one or more embodiments of the disclosure. As described further below, the paint roller 400 may be configured for painting various surfaces, such as walls, instead of using a traditional paint brush. It will be appreciated that the paint roller 400 may include certain components and features configured in a manner similar to those of the hand rake 100 described above. Corresponding components and features are identified with corresponding reference numbers (i.e., reference numbers beginning with a "4" instead of a "1").

The paint roller 400 may be formed as an elongated structure, as shown, having a first end 402 (which also may be referred to as a "proximal end" or a "user end") and a second end 404 (which also may be referred to as a "distal end" or a "working end"). The paint roller 400 may include a number of components and/or assemblies that are separately formed and attached to one another to form the paint roller 400. In particular, the paint roller 400 may include a roller assembly 410 (which also may be referred to as a "roller body," a "working assembly," or a "working body"), and a hand guard 470 (which also may be referred to as a "hand shield," a "safety guard," or a "guard box") which are separately formed and attached to one another. In certain embodiments, the roller assembly 410 and the hard guard 470 may be fixedly (i.e., permanently) attached to one another. In other embodiments, the roller assembly 410 and the hand guard 470 may be removably attached to one another, for example, to facilitate cleaning of the paint roller 400 or to allow for modular use of the hand guard 470 with other working bodies or assemblies configured for performing other gardening, yardwork, or home improvement tasks. Further details regarding the attachment of the roller assembly 410 and the hand guard 470 are described below.

The roller assembly 410 may be formed as an elongated structure, as shown, having a first end 412 (which also may be referred to as a "proximal end" or a "user end") and a second end 414 (which also may be referred to as a "distal end" or a "working end"). The roller assembly 410 may include a handle portion 416 (which also may be referred to as a "gripping portion") and a support portion 436 (which also may be referred to as a "working portion") attached to one another. The handle portion 416 may extend from the first end 412 of the roller assembly 410 to the support portion 436, and the support portion 436 may extend from the second end 414 of the roller assembly 410 to the handle portion 416. In certain embodiments, the handle portion 416 and the support portion 436 may be separately formed and attached, either fixedly or removably, to one another. In other embodiments, parts of the handle portion 416 and the support portion 436 may be integrally formed with one another. In other words, parts of the handle portion 416 and the support portion 436 may be formed as a single component from the same material. In certain embodiments, the handle portion 416 may be formed of a metal, such as stainless steel, aluminum, or other metals having suitable rigidity and durability for withstanding forces exerted by a user during painting. According to such embodiments, the handle portion 416 may be formed from sheet metal that is cut to define the various features of the handle portion 416. In other embodiments, the handle portion 416 may be formed of a plastic, a composite, or other suitable materials. According to such embodiments, the handle portion 416 may be formed by molding or other suitable manufacturing processes to define the various features of the handle portion 416.

As shown, the handle portion 416 may include a top surface 420, a bottom surface 422, and one or more finger openings 424 defined in the handle portion 416 and extending from the top surface 420 to the bottom surface 422. In certain embodiments, as shown, the handle portion 416 may be planar or substantially planar in shape, such that the top surface 420 and the bottom surface 422 are planar or substantially planar and arranged parallel to one another. In other embodiments, the handle portion 416 may be contoured (i.e., non-planar) in shape, such that the top surface 420 and the bottom surface 422 are contoured surfaces having a curved or otherwise non-planar shape. In certain embodiments, as shown, the handle portion 416 may include only a single, elongated finger opening 424 configured to receive a user's fingers therethrough. In other embodiments, the handle portion 416 may include two, three, or four separate finger openings 424 each configured to receive one or more of the user's fingers therethrough. According to the illustrated embodiment, the finger opening 424 may have a curved profile for ergonomic support of the user's fingers therein and may include one or more protrusions 426 projecting inward to facilitate gripping during use of the paint roller 400.

The finger opening 424 may be spaced apart from the first end 412 of the support assembly 410, as shown, and the handle portion 416 may include a cross-member 428 positioned between the finger opening 424 and the first end 412 and extending along the width of the handle portion 416. When grasped by a user, the cross-member 428 may be held within the user's palm, while the user's fingers extend downward through the finger opening 424 and the user's thumb extends below the cross-member 428. In certain embodiments, the paint roller 400 may include one or more grip members 430 positioned along the cross-member 428 of the handle portion 416. In particular, one grip member 430 may be positioned along the cross-member 428 on the top surface 420 of the handle portion 416, and another grip member 430 may be positioned along the cross-member 428 on the bottom surface 422 of the handle portion 416. This arrangement may provide an improved ergonomic feel when the user grasps the handle portion 416, particularly when the handle portion 416 is formed of sheet metal. The grip members 430 may be fixedly attached to the handle portion 416 by one or more adhesives, fasteners, or other suitable means of attachment. In certain embodiments, the grip members 430 may be formed of a compressible material that compresses when the user grasps the handle portion 416 to facilitate secure and comfortable gripping. In other embodiments, the grip members 430 may be formed of a rigid or substantially rigid material, and a layer of compressible material may be positioned between each of the grip members 430 and the cross-member 428. In this manner, the compressible material layers may allow some movement of the grip members 430 when grasped by a user, thereby facilitating secure and comfortable gripping of the handle portion 416.

The handle portion 416 of the support assembly 410 may include a plurality of tabs 432 (which also may be referred to simply as "protrusions") extending laterally outward along opposing sides of the handle portion 416, as shown. As described below, the tabs 432 may be configured to facilitate attachment of the support assembly 410 to the hand guard 470. In certain embodiments, as shown, the handle portion 416 may include two tabs 432 positioned along one side of the handle portion 416 and two tabs 432 positioned along the opposite side of the handle portion 416. In other embodiments, any number of tabs 432 may be used.

As shown, the support portion 436 may include a support arm 438 and a cover support 440 movably attached to one another. The support arm 438 may be formed as an elongated bar or rod having a straight section extending from the handle portion 416 and a U-shaped section positioned at a distal end of the support arm 438. As shown, the straight section of the support arm 438 may be attached to the handle portion 416. In certain embodiments, as shown, the support arm 438 may be fixedly attached to the handle portion 416, for example, by welding, soldering, or other suitable means of attachment. In other embodiments, the support arm 438 may be removably attached to the handle portion 416 by one or more releasable attachment means. The cover support 440 may be rotatably attached to the U-shaped section of the support arm 438 and configured to removably receive a roller cover 442 positioned thereon. In certain embodiments, the support arm 438 may be formed of a metal, such as stainless steel or aluminum, although other suitably rigid and durable materials may be used. In certain embodiments, the cover support 440 may be formed of a metal and/or a plastic, although other suitably rigid and durable materials may be used. The roller cover 442 may be formed in a conventional manner for receiving paint thereon and applying the paint to a desired surface.

The hand guard 470 may be formed as an elongated, box-like structure, as shown, having a first end 472 (which also may be referred to as a "proximal end" or an "open end") and a second end 474 (which also may be referred to as a "distal end" or a "closed end"). The hand guard 470 may include a plurality of walls defining an interior space 476 therebetween, as shown. In particular, the hand guard 470 may include a front wall 478, a top wall 480, a first sidewall 482, and a second sidewall 484. As shown, the front wall 478 may be positioned along the second end 474 of the hand guard 470, and each of the top wall 480, the first sidewall 482, and the second sidewall 484 may extend from the from the first end 472 to the second end 474 of the hand guard 470 (i.e., from the first end 472 to the front wall 478). In certain embodiments, the hand guard 470 also may include a first transition wall 486 extending from the first sidewall 482 to the top wall 480 and from the from the first end 472 to the second end 474 of the hand guard 470 (i.e., from the first end 472 to the front wall 478), and a second transition wall 488 extending from the second sidewall 484 to the top wall 480 and from the first end 472 to the second end 474 of the hand guard 470 (i.e., from the first end 472 to the front wall 478). In other embodiments, the transition walls 486, 488 may be omitted, such that the sidewalls 482, 484 extend to the top wall 480. In certain embodiments, as shown, the walls 478, 480, 482, 484, 486, 488 may be integrally formed with one another from the same material. In other embodiments, one or more of the walls 478, 480, 482, 484, 486, 488 may be separately formed and fixedly attached to one another. In certain embodiments, the hand guard 470 may be formed of a plastic having suitable rigidity and durability for withstanding contact with various surrounding objects during use of the paint roller 400. In some such embodiments, the hand guard 470 may be formed by molding, extruding, or other suitable manufacturing processes to define the various features of the hand guard 470. In other embodiments, the hand guard 470 may be formed of a metal, a composite, or other suitable materials. In some such embodiments, the hand guard 470 may be formed from sheet metal that is cut and bent to define the various features of the hand guard 470.

As shown, the walls 478, 480, 482, 484, 486, 488 of the hand guard 470 may be planar or substantially planar in shape, and interfaces between the walls 478, 480, 482, 484, 486, 488 may be rounded or curved to inhibit the hand guard 470 from snagging surrounding objects during use of the paint roller 400. The front wall 478 may be angled relative to the top wall 480 at an obtuse angle, as shown, to provide a user with improved visibility of the roller assembly 410 and the roller cover 442. The transition walls 486, 488 also may be angled relative to the top wall 480 at respective obtuse angles and angled relative to the sidewalls 482, 484 at respective obtuse angles to provide improved visibility. The sidewalls 482, 484 may be parallel or substantially parallel to one another, as shown. In other embodiments, one or more or all of the walls 478, 480, 482, 484, 486, 488 may be contoured (i.e., non-planar) in shape, such that the walls 478, 480, 482, 484, 486, 488 define contoured surfaces having a curved or otherwise non-planar shape. The hand guard 470 may include one or more mounting holes 490 defined therein and configured to facilitate attachment of the hand guard 470 to the roller assembly 410, as described below. In certain embodiments, as shown, the mounting holes 490 may be defined in the sidewalls 482, 484 of the hand guard 470, although other positions of the mounting holes 490 in the hand guard 470 may be used. Although the illustrated embodiment includes two mounting holes 490 defined in the first sidewall 482 and two mounting holes 490 defined in the second sidewall 484, any number of the mounting holes 490 may be used and may be defined in any of the walls 478, 480, 482, 484, 486, 488 of the hand guard 470.

As shown, the roller assembly 410 and the hand guard 470 may be attached to one another via the tabs 432 and the mounting holes 490. In particular, during assembly of the paint roller 400, the sidewalls 482, 484 of the hand guard 470 may be resiliently deflected away from one another, while the hand guard 470 is positioned over the handle portion 416 of the roller assembly 410, and then allowed to return to their natural position with respect to one another such that the tabs 432 are received within the mounting holes 490. In this manner, the roller assembly 410 and the hand guard 470 may be three-dimensionally secured with respect to one another (i.e., constrained in respective X, Y, and Z planes). In certain embodiments, the roller assembly 410 and the hand guard 470 may be fixedly attached to one another. For example, after positioning the tabs 432 within the mounting holes 490, an adhesive may be applied along interfaces of the handle portion 416 of the roller assembly 410 and the hand guard 470 to fixedly attach the components to one another, although other means of permanent attachment may be used. In other embodiments, the roller assembly 410 and the hand guard 470 may be removably attached to one another. For example, the tabs 432 and the mounting holes 490 may be disengaged by resiliently deflecting the sidewalls 482, 484 of the hand guard 470 away from one another and removing the hand guard 470 from the handle portion 416. This removable configuration may facilitate cleaning of the paint roller 400 and also may allow for modular use of the hand guard 470 with other working bodies or assemblies. Although the illustrated embodiment provides the roller assembly 410 and the hand guard 470 attached to one another via the tabs 432 and the mounting holes 490, it will be appreciated that other types of engagement mechanisms may be used to fixedly or removably attach the roller assembly 410 and the hand guard 470.

With the hand guard 470 attached to the roller assembly 410, the hand guard 470 may cover (i.e., be positioned over) and be spaced apart from the top surface 420 of the handle portion 416, while the support portion 436 extends distally beyond the second end 474 of the hand guard 470, as shown. In certain embodiments, the support portion 436 may extend distally beyond the second end 474 of the hand guard 470 by at least 4 inches, at least 6 inches, at least 8 inches, at least 10 inches, at least 12 inches, at least 14 inches, at least 16 inches, at least 18 inches, at least 20 inches, or more. It will be appreciated that the support portion 436 may come in different sizes having different lengths to provide an ample length for reaching different surfaces to be painted. With the paint roller 400 assembled as shown, a user may grasp the handle portion 416 as described above, with the user's palm engaging the cross-member 428 and the top grip member 430, the user's fingers extending through the finger opening 424 and engaging the cross-member 428 and the bottom grip member 430, and the user's thumb extending below and engaging the cross-member 428 and the bottom grip member 430 to securely grasp the paint roller 400. In this manner, a majority of the user's hand may be positioned within the interior space 476 of the hand guard 470, between the handle portion 416 and the hand guard 470, and protected from potential harm during use of the paint roller 400. In certain embodiments, the paint roller 400 also may include a lower guard that is fixedly or removably attached to the roller assembly 410 or the hand guard 470. For example, the lower guard may include mounting holes, similar to the mounting holes 490 of the hand guard 470, which receive the exposed portions of the tabs 432 (i.e., the portions of the tabs 432 extending outward beyond the mounting holes 490) in a similar manner. During use, the lower guard may cover (i.e., be positioned under) and be spaced apart from the bottom surface 422 of the handle portion 416, such that the portions of the user's fingers and thumb are positioned between the lower guard and the handle portion 416. In certain embodiments, the lower guard may be removably attached to the roller assembly 410 or the hand guard 470. In this manner, the lower guard may be selectively attached when desired by a user or removed when use of the lower guard is not desired. In other embodiments, the lower guard may be fixedly attached to the roller assembly 410 or the hand guard 470 for permanent use.

In certain embodiments, as shown, the paint roller 400 may include a number of wheels 492 attached to the hand guard 470 and configured to facilitate movement of the paint roller 400 along a working surface. In particular, the paint roller 400 may include a pair of wheels 492, with one wheel 492 positioned along one side of the hand guard 470 and another wheel 492 positioned along the opposite side of the hand guard 470. As shown, the wheels 492 may extend downward below the hand guard 470. In this manner, the wheels 492 may directly contact and roll along a working surface as a user moves the paint roller 400 back and forth along the working surface. The wheels 492 may provide the user with additional support and allow the user to apply even pressure to a surface being painted with the roller cover 442. As shown, the first wheel 492 may be rotatably attached to the first sidewall 482 of the hand guard 470, and the second wheel 492 may be rotatably attached to the second sidewall 484 of the hand guard 470. The wheels 492 may be attached to the hand guard 470 via one or more fasteners 494. In certain embodiments, the fasteners 494 may include screws and/or nuts, although other types of mechanical fasteners may be used to rotatably attach the wheels 492 to the hand guard 470.

The paint roller 400 described above may provide several benefits over existing single-handed paint rollers. Most notably, the hand guard 470 may effectively protect the user's working hand from potential harm, such as paint spray, when using the paint roller 400 to paint various surfaces, and may eliminate the need for gloves when performing these tasks. Additionally, the configuration of the paint roller 400 may allow the user to easily grasp the tool in a comfortable and ergonomic manner while keeping the user's working hand protected. Ultimately, the disclosed paint roller 400 provides a simple, durable, low cost, and easy to manufacture and assemble tool for painting while removing the worry of potential harm to the user's working hand. It will be appreciated that the configuration of the paint roller 400 may allow the user to easily grasp the tool with the user's right hand or left hand interchangeably. In this manner, the user may alternate which hand is the working hand, as may be desired when using the paint roller 400 over an extended period of time. Moreover, the wheels 492 of the paint roller 400 may assist the user in applying even pressure to a surface being painted with the roller cover 442, thereby enhancing the quality of the paint job. Further advantages and benefits of the paint roller 400 over existing paint rollers will be appreciated from the foregoing description.

Figure 5A:
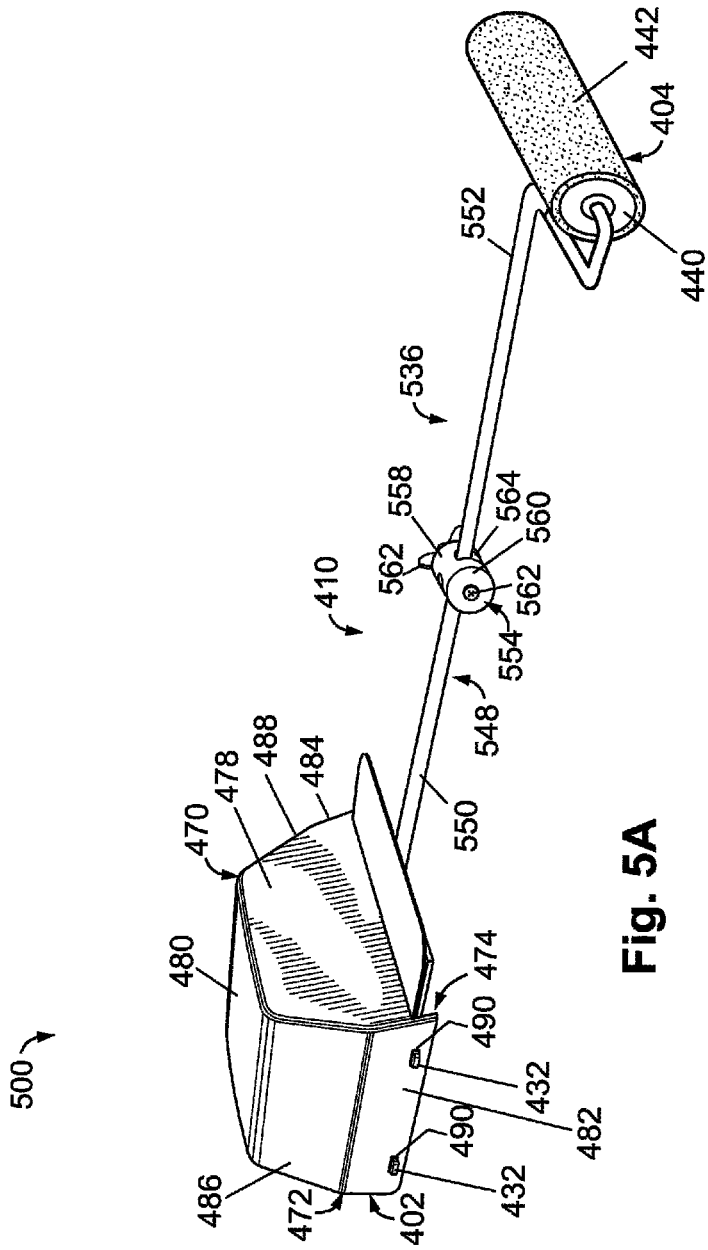
FIG. 5A is a perspective view of a hand-operated paint roller in accordance with one or more embodiments of the disclosure.

FIGS. 5A-5C illustrate a hand-operated paint roller 500 (which also may be referred to as simply a "hand tool") according to one or more embodiments of the disclosure. As described further below, the paint roller 500 may be configured for painting various surfaces, such as walls, instead of using a traditional paint brush. It will be appreciated that the paint roller 500 may include certain components and features configured in a manner similar to those of the paint roller 500 described above. Identical components and features are identified with the same reference numbers (i.e., reference numbers beginning with a "4") and perform the same functions described above with respect to the paint roller 400. Different components and features are identified with reference numbers beginning with a "5" and their functions are described below.

As shown, the paint roller 500 may include a support portion 536 that allows a user to adjust a position of the cover support 440 and the roller cover 442 relative to the hand guard 470. In particular, the support portion 536 may include a support arm assembly 548 that allows for such adjustment. As shown, the support arm assembly 548 may include a first arm 550 and a second arm 552 movably attached to one another. The first arm 550 may be formed as an elongated bar or rod having a straight shape and may be attached to the handle portion 416 of the support assembly 410. In certain embodiments, the first arm 550 may be fixedly attached to the handle portion 416, for example, by welding, soldering, or other suitable means of attachment. In other embodiments, the first arm 550 may be removably attached to the handle portion 416 by one or more releasable attachment means. The second arm 552 may be formed as an elongated bar or rod having a straight section extending from the first arm 550 and a U-shaped section positioned at a distal end of the second arm 552. The cover support 440 may be rotatably attached to the U-shaped section of the second arm 552 and configured to removably receive the roller cover 442 positioned thereon. In certain embodiments, the first arm 550 and the second arm 552 may be formed of a metal, such as stainless steel or aluminum, although other suitably rigid and durable materials may be used.

The first arm 550 and the second arm 552 may be movably attached to one another by a hinge connection 554, as shown. In this manner, the second arm 552 may be pivotable relative to the first arm 550 and the hand guard 470, thereby allowing for selective adjustment of the position of the cover support 440 and the roller cover 442 relative to the hand guard 470. In particular, the support arm assembly 548 may be moved between a straight configuration in which the longitudinal axes of the first arm 550 and the second arm 552 are coaxial with one another, as shown in FIGS. 5A and 5B, and an angled configuration in which the longitudinal axes of the first arm 550 and the second arm 552 define an angle α therebetween. The angle α may be selectively adjusted by a user to obtain a desired position of the cover support 440 and the roller cover 442 relative to the hand guard 470.

The hinge connection 554 may be secured via a lock 556 (which also may be referred to as a "locking mechanism") configured to selectively maintain a desired angle α between the longitudinal axes of the first arm 550 and the second arm 552. In other words, the lock 556 may be engaged to prevent pivotal movement between the first arm 550 and the second arm 552. In certain embodiments, as shown, the lock 556 may include an outer housing 558, an an inner cylinder 560 positioned within the outer housing 558 and configured to rotate with respect to the outer housing 558, and a fastener 562. In certain embodiments, the outer housing 558 may be fixedly attached to the first arm 550, and the inner cylinder 560 may be fixedly attached to the second arm 552. In other embodiments, the outer housing 558 may be fixedly attached to the second arm 552, and the inner cylinder 560 may be fixedly attached to the first arm 550. As the inner cylinder 560 rotates with respect to the outer housing 558, the second arm 552 may pivot relative to the first arm 550. In certain embodiments, as shown, the fastener 562 may include a screw and a nut, such as a wing nut, although other types of releasable mechanical fasteners may be used. In this manner, the user may loosen the fastener 562 to allow for pivotal adjustment of the first arm 550 and the second arm 552 to a desired angle α, and then tighten the fastener 562 to secure the lock 556 and prevent pivotal movement of the first arm 550 and the second arm 552. In certain embodiments, the outer housing 558 may include a slot 564, and the second arm 552 may extend through the slot 564, as shown. In this manner, the sidewalls of the slot 564 may prevent or at least inhibit the first arm 552 from deflecting laterally at the hinge connection 554. In certain embodiments, the slot 564 may include a number of notches defined along the sidewalls of the slot 564 and configured to receive the second arm 552 therein. In this manner, the hinge connection 554 may have a number of predefined angled positions in which the second arm 552 may be securely retained when the lock 556 is engaged, in order to further secure the second arm 552 relative to the first arm 550. In other embodiments, the notches may be omitted, and the slot 564 may have smooth sidewalls, which may allow the second arm 552 to be secured in any angled position relative to the first arm 550. Although the illustrated embodiment shows the hinge connection 554 arranged to allow pivotal adjustment of the arms 550, 552 in the vertical direction (i.e., upward and downward relative to the hand guard 470), the hinge connection 554 may be arranged to allow pivotal adjustment of the arms 550, 552 in the horizontal direction (i.e., laterally, side-to-side relative to the hand guard 470) in other embodiments.

The paint roller 500 described above may provide several benefits over existing single-handed paint rollers. Most notably, the hand guard 470 may effectively protect the user's working hand from potential harm, such as paint spray, when using the paint roller 500 to paint various surfaces, and may eliminate the need for gloves when performing these tasks. Additionally, the configuration of the paint roller 500 may allow the user to easily grasp the tool in a comfortable and ergonomic manner while keeping the user's working hand protected. Ultimately, the disclosed paint roller 500 provides a simple, durable, low cost, and easy to manufacture and assemble tool for painting while removing the worry of potential harm to the user's working hand. It will be appreciated that the configuration of the paint roller 500 may allow the user to easily grasp the tool with the user's right hand or left hand interchangeably. In this manner, the user may alternate which hand is the working hand, as may be desired when using the paint roller 500 over an extended period of time. Moreover, the adjustable nature of the support arm assembly 548 may allow the user to selectively adjust the position of the cover support 440 and the roller cover 442 relative to the hand guard 470, as desired. In this manner, the user may adjust the paint roller 500 to more easily paint different surfaces in an ergonomic manner and to maximize the degree of protection provided by the hand guard 470. Further advantages and benefits of the paint roller 500 over existing paint rollers will be appreciated from the foregoing description.

Figure 6:
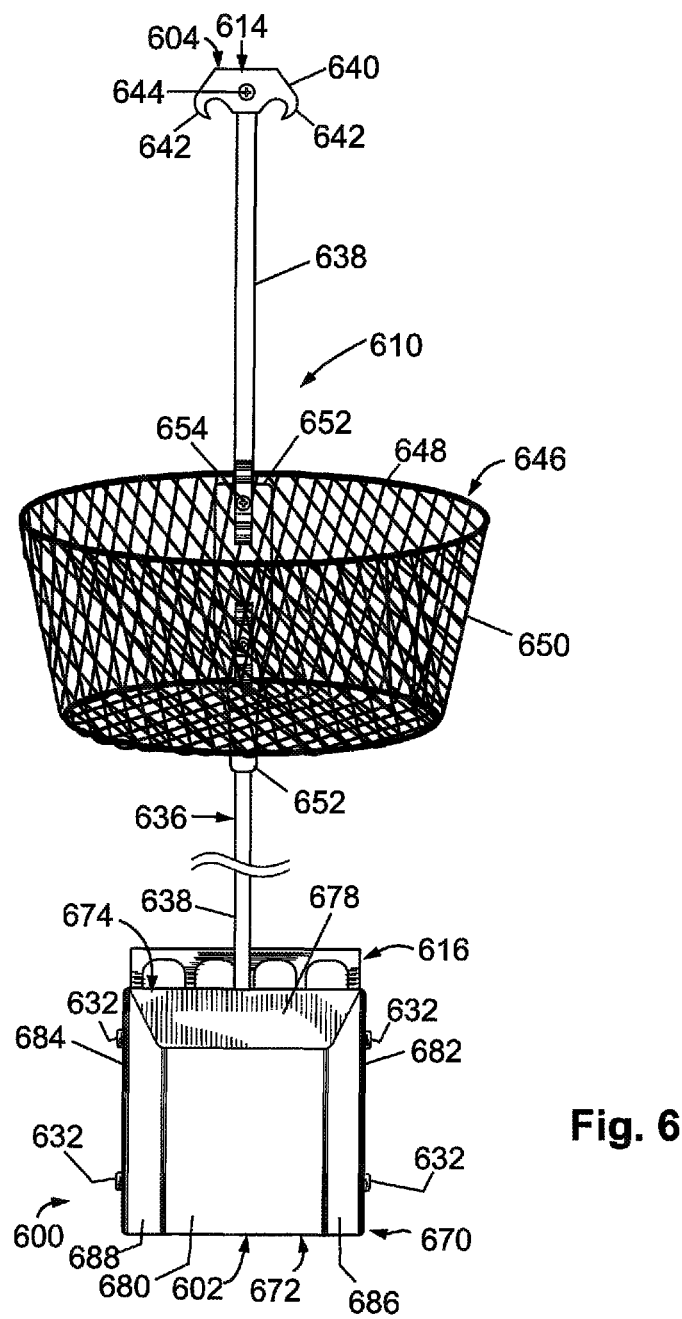
FIG. 6 is a top view of a hand-operated fruit picker in accordance with one or more embodiments of the disclosure.

FIG. 6 illustrates a hand-operated fruit picker 600 (which also may be referred to as simply a "hand tool") according to one or more embodiments of the disclosure. As described further below, the fruit picker 600 may be configured for picking and collecting various fruits from trees, although other uses of the fruit picker 600 may exist. It will be appreciated that the fruit picker 600 may include certain components and features configured in a manner similar to those of the hand rake 100 described above. Corresponding components and features are identified with corresponding reference numbers (i.e., reference numbers beginning with a "6" instead of a "1"). It will be understood that certain features of the fruit picker 600 which are described below but not shown in FIG. 6 may be configured in the same manner as the corresponding features of the hand rake 100 described above and shown in FIGS. 1A-1F.

The fruit picker 600 may be formed as an elongated structure, as shown, having a first end 602 (which also may be referred to as a "proximal end" or a "user end") and a second end 604 (which also may be referred to as a "distal end" or a "working end"). The fruit picker 600 may include a number of components and/or assemblies that are separately formed and attached to one another to form the fruit picker 600. In particular, the fruit picker 600 may include a picker assembly 610 (which also may be referred to as a "picker body," a "working assembly," or a "working body"), and a hand guard 670 (which also may be referred to as a "hand shield," a "safety guard," or a "guard box") which are separately formed and attached to one another. In certain embodiments, the picker assembly 610 and the hard guard 670 may be fixedly (i.e., permanently) attached to one another. In other embodiments, the picker assembly 610 and the hand guard 670 may be removably attached to one another, for example, to facilitate cleaning of the fruit picker 600 or to allow for modular use of the hand guard 670 with other working bodies or assemblies configured for performing other gardening, yardwork, or home improvement tasks. Further details regarding the attachment of the picker assembly 610 and the hand guard 670 are described below.

The picker assembly 610 may be formed as an elongated structure, as shown, having a first end 612 (which also may be referred to as a "proximal end" or a "user end") and a second end 614 (which also may be referred to as a "distal end" or a "working end"). The picker assembly 610 may include a handle portion 616 (which also may be referred to as a "gripping portion") and a support portion 636 (which also may be referred to as a "working portion") attached to one another. The handle portion 616 may extend from the first end 612 of the picker assembly 610 to the support portion 636, and the support portion 636 may extend from the second end 614 of the picker assembly 610 to the handle portion 616. In certain embodiments, as shown, the handle portion 616 and the support portion 636 may be separately formed and attached, either fixedly or removably, to one another. In other embodiments, parts of the handle portion 616 and the support portion 636 may be integrally formed with one another. In other words, parts of the handle portion 616 and the support portion 636 may be formed as a single component from the same material. In certain embodiments, the handle portion 616 may be formed of a metal, such as stainless steel, aluminum, or other metals having suitable rigidity and durability for withstanding forces exerted by a user during painting. According to such embodiments, the handle portion 616 may be formed from sheet metal that is cut to define the various features of the handle portion 616. In other embodiments, the handle portion 616 may be formed of a plastic, a composite, or other suitable materials. According to such embodiments, the handle portion 616 may be formed by molding or other suitable manufacturing processes to define the various features of the handle portion 616.

As shown, the handle portion 616 may include a top surface 620, a bottom surface 622, and one or more finger openings 624 defined in the handle portion 616 and extending from the top surface 620 to the bottom surface 622. In certain embodiments, as shown, the handle portion 616 may be planar or substantially planar in shape, such that the top surface 620 and the bottom surface 622 are planar or substantially planar and arranged parallel to one another. In other embodiments, the handle portion 616 may be contoured (i.e., non-planar) in shape, such that the top surface 620 and the bottom surface 622 are contoured surfaces having a curved or otherwise non-planar shape. In certain embodiments, as shown, the handle portion 616 may include only a single, elongated finger opening 624 configured to receive a user's fingers therethrough. In other embodiments, the handle portion 616 may include two, three, or four separate finger openings 624 each configured to receive one or more of the user's fingers therethrough. According to the illustrated embodiment, the finger opening 624 may have a curved profile for ergonomic support of the user's fingers therein and may include one or more protrusions 626 projecting inward to facilitate gripping during use of the fruit picker 600.

The finger opening 624 may be spaced apart from the first end 612 of the support assembly 610, as shown, and the handle portion 616 may include a cross-member 628 positioned between the finger opening 624 and the first end 612 and extending along the width of the handle portion 616. When grasped by a user, the cross-member 628 may be held within the user's palm, while the user's fingers extend downward through the finger opening 624 and the user's thumb extends below the cross-member 628. In certain embodiments, the fruit picker 600 may include one or more grip members 630 positioned along the cross-member 628 of the handle portion 616. In particular, one grip member 630 may be positioned along the cross-member 628 on the top surface 620 of the handle portion 616, and another grip member 630 may be positioned along the cross-member 628 on the bottom surface 622 of the handle portion 616. This arrangement may provide an improved ergonomic feel when the user grasps the handle portion 616, particularly when the handle portion 616 is formed of sheet metal. The grip members 630 may be fixedly attached to the handle portion 616 by one or more adhesives, fasteners, or other suitable means of attachment. In certain embodiments, the grip members 630 may be formed of a compressible material that compresses when the user grasps the handle portion 616 to facilitate secure and comfortable gripping. In other embodiments, the grip members 630 may be formed of a rigid or substantially rigid material, and a layer of compressible material may be positioned between each of the grip members 630 and the cross-member 628. In this manner, the compressible material layers may allow some movement of the grip members 630 when grasped by a user, thereby facilitating secure and comfortable gripping of the handle portion 616.

The handle portion 616 of the picker assembly 610 may include a plurality of tabs 632 (which also may be referred to simply as "protrusions") extending laterally outward along opposing sides of the handle portion 616, as shown. As described below, the tabs 632 may be configured to facilitate attachment of the picker assembly 610 to the hand guard 670. In certain embodiments, as shown, the handle portion 616 may include two tabs 632 positioned along one side of the handle portion 616 and two tabs 632 positioned along the opposite side of the handle portion 616. In other embodiments, any number of tabs 632 may be used.

As shown, the support portion 636 may include a support arm 638 having an elongated shape extending from the handle portion 616. In certain embodiments, as shown, the support arm 638 may have a straight shape extending in a linear manner. In other embodiments, the support arm 638 may have a contoured (i.e., non-linear) shape that is curved or otherwise contoured to facilitate maneuvering of the fruit picker 600 through and around tree limbs and to provide improved visibility of the support portion 636 during use of the fruit picker 600. In certain embodiments, as shown, the support arm 638 may be fixedly attached to the handle portion 616, for example, by welding, soldering, or other suitable means of attachment. In other embodiments, the support arm 638 may be removably attached to the handle portion 616 by one or more releasable attachment means.

The support arm 638 may have a cutting blade 640 (which also may be referred to as a "cutting member") attached thereto at or near the second end 614 of the picker assembly 610. The cutting blade 640 may be configured for cutting or otherwise separating fruit from a tree. In particular, the cutting blade 640 may include one or more hooks 642 configured for cutting fruit from a tree. Although the illustrated embodiment of the cutting blade 640 includes two hooks 642, any number of the hooks 642 may be used. In certain embodiments, the hooks 642 may be oriented proximally, as shown, such that the hooks 642 may be positioned above or behind the stem of a piece of fruit and then pulled toward the user to cut the stem. Other orientations of the hooks 642 may be used in other embodiments. In certain embodiments, the cutting blade 640 may be attached to the support arm 638 by one or more fasteners 644. The fasteners 644 may include screws and/or nuts, although other types of mechanical fasteners may be used. In certain embodiments, the cutting blade 640 may be fixedly attached to the support arm 638. In other embodiments, the cutting blade 640 may be removably attached to the support arm 638. In this manner, different types of cutting blades 640 may be attached to the support arm 638 to facilitate picking of different types of fruits. In certain embodiments, the cutting blade 640 may be removably attached at multiple different positions along the length of the support arm 638, as desired. Although the illustrated embodiment includes only a single cutting blade 640, multiple cutting blades 640 may be attached to the support arm 638 in other embodiments. It will be appreciated that the size and configuration of the cutting blade 640 may be selected depending on the type of fruit that is being picked.

As shown, the support arm 638 also may have a basket 646 (which also may be referred to as a "collection basket," a "container," or a "collection container") attached thereto at a location between the first end 612 and the second end 614 of the picker assembly 610. In particular, the basket 646 may be attached to the support arm 638 at a location positioned between the hand guard 670 and the cutting blade 640. In this manner, the basket 646 may be configured to receive and contain fruit that is cut from a tree by the cutting blade 640. For example, when the fruit picker 600 is oriented in a vertical, upright manner (i.e., with the cutting blade 640 positioned substantially above the hand guard 670) and the cutting blade 640 cuts a stem of a fruit as the user pulls the fruit picker 600 downward, the cut fruit may fall into the basket 646 and be collected therein. In certain embodiments, as shown, the basket 646 may include a basket frame 648 and a mesh covering 650 attached to the basket frame 646. Other configurations of the basket 646 may be used. For example, the basket 646 may include solid walls instead of the mesh covering 650. It will be appreciated that the size and configuration of the basket 646 may be selected depending on the type of fruit that is being picked and collected.

The basket 646 may be attached to the support arm 638 by one or more brackets 652 and one or more fasteners 654, as shown. The fasteners 654 may include screws and/or nuts, although other types of mechanical fasteners may be used. In certain embodiments, the basket 646 may be fixedly attached to the support arm 638. In other embodiments, the basket 646 may be removably attached to the support arm 638. In this manner, different types of baskets 646 may be attached to the support arm 638 to facilitate collection of different types of fruits. In certain embodiments, the basket 646 may be removably attached at multiple different positions along the length of the support arm 638, as desired. Although the illustrated embodiment includes only a single basket 646, multiple baskets 646 may be attached to the support arm 638 in other embodiments.

The hand guard 670 may be formed as an elongated, box-like structure, as shown, having a first end 672 (which also may be referred to as a "proximal end" or an "open end") and a second end 674 (which also may be referred to as a "distal end" or a "closed end"). The hand guard 670 may include a plurality of walls defining an interior space 676 therebetween, as shown. In particular, the hand guard 670 may include a front wall 678, a top wall 680, a first sidewall 682, and a second sidewall 684. As shown, the front wall 678 may be positioned along the second end 674 of the hand guard 670, and each of the top wall 680, the first sidewall 682, and the second sidewall 684 may extend from the from the first end 672 to the second end 674 of the hand guard 670 (i.e., from the first end 672 to the front wall 678). In certain embodiments, the hand guard 670 also may include a first transition wall 686 extending from the first sidewall 682 to the top wall 680 and from the from the first end 672 to the second end 674 of the hand guard 670 (i.e., from the first end 672 to the front wall 678), and a second transition wall 688 extending from the second sidewall 684 to the top wall 680 and from the first end 672 to the second end 674 of the hand guard 670 (i.e., from the first end 672 to the front wall 678). In other embodiments, the transition walls 686, 688 may be omitted, such that the sidewalls 682, 684 extend to the top wall 680. In certain embodiments, as shown, the walls 678, 680, 682, 684, 686, 688 may be integrally formed with one another from the same material. In other embodiments, one or more of the walls 678, 680, 682, 684, 686, 688 may be separately formed and fixedly attached to one another. In certain embodiments, the hand guard 670 may be formed of a plastic having suitable rigidity and durability for withstanding contact with various surrounding objects during use of the fruit picker 600. In some such embodiments, the hand guard 670 may be formed by molding, extruding, or other suitable manufacturing processes to define the various features of the hand guard 670. In other embodiments, the hand guard 670 may be formed of a metal, a composite, or other suitable materials. In some such embodiments, the hand guard 670 may be formed from sheet metal that is cut and bent to define the various features of the hand guard 670.

As shown, the walls 678, 680, 682, 684, 686, 688 of the hand guard 670 may be planar or substantially planar in shape, and interfaces between the walls 678, 680, 682, 684, 686, 688 may be rounded or curved to inhibit the hand guard 670 from snagging surrounding objects during use of the fruit picker 600. The front wall 678 may be angled relative to the top wall 680 at an obtuse angle, as shown, to provide a user with improved visibility of the picker assembly 610 and the fruit being picked. The transition walls 686, 688 also may be angled relative to the top wall 680 at respective obtuse angles and angled relative to the sidewalls 682, 684 at respective obtuse angles to provide improved visibility. The sidewalls 682, 684 may be parallel or substantially parallel to one another, as shown. In other embodiments, one or more or all of the walls 678, 680, 682, 684, 686, 688 may be contoured (i.e., non-planar) in shape, such that the walls 678, 680, 682, 684, 686, 688 define contoured surfaces having a curved or otherwise non-planar shape. The hand guard 670 may include one or more mounting holes 690 defined therein and configured to facilitate attachment of the hand guard 670 to the picker assembly 610, as described below. In certain embodiments, as shown, the mounting holes 690 may be defined in the sidewalls 682, 684 of the hand guard 670, although other positions of the mounting holes 690 in the hand guard 670 may be used. Although the illustrated embodiment includes two mounting holes 690 defined in the first sidewall 682 and two mounting holes 690 defined in the second sidewall 684, any number of the mounting holes 690 may be used and may be defined in any of the walls 678, 680, 682, 684, 686, 688 of the hand guard 670.

As shown, the picker assembly 610 and the hand guard 670 may be attached to one another via the tabs 632 and the mounting holes 690. In particular, during assembly of the fruit picker 600, the sidewalls 682, 684 of the hand guard 670 may be resiliently deflected away from one another, while the hand guard 670 is positioned over the handle portion 616 of the picker assembly 610, and then allowed to return to their natural position with respect to one another such that the tabs 632 are received within the mounting holes 690. In this manner, the picker assembly 610 and the hand guard 670 may be three-dimensionally secured with respect to one another (i.e., constrained in respective X, Y, and Z planes). In certain embodiments, the roller assembly 610 and the hand guard 670 may be fixedly attached to one another. For example, after positioning the tabs 632 within the mounting holes 690, an adhesive may be applied along interfaces of the handle portion 616 of the picker assembly 610 and the hand guard 670 to fixedly attach the components to one another, although other means of permanent attachment may be used. In other embodiments, the picker assembly 610 and the hand guard 670 may be removably attached to one another. For example, the tabs 632 and the mounting holes 690 may be disengaged by resiliently deflecting the sidewalls 682, 684 of the hand guard 670 away from one another and removing the hand guard 670 from the handle portion 616. This removable configuration may facilitate cleaning of the fruit picker 600 and also may allow for modular use of the hand guard 670 with other working bodies or assemblies. Although the illustrated embodiment provides the picker assembly 610 and the hand guard 670 attached to one another via the tabs 632 and the mounting holes 690, it will be appreciated that other types of engagement mechanisms may be used to fixedly or removably attach the picker assembly 610 and the hand guard 670.

With the hand guard 670 attached to the picker assembly 610, the hand guard 670 may cover (i.e., be positioned over) and be spaced apart from the top surface 620 of the handle portion 616, while the support portion 636 extends distally beyond the second end 674 of the hand guard 670, as shown. In certain embodiments, the support portion 636 may extend distally beyond the second end 674 of the hand guard 670 by at least 1 foot, at least 2 feet, at least 4 feet, at least 6 feet, at least 8 feet, at least 10 feet, or more. It will be appreciated that the support portion 636 may come in different sizes having different lengths to provide an ample length for reaching fruit in different types of trees. With the fruit picker 600 assembled as shown, a user may grasp the handle portion 616 as described above, with the user's palm engaging the cross-member 628 and the top grip member 630, the user's fingers extending through the finger opening 624 and engaging the cross-member 628 and the bottom grip member 630, and the user's thumb extending below and engaging the cross-member 628 and the bottom grip member 630 to securely grasp the fruit picker 600. In this manner, a majority of the user's hand may be positioned within the interior space 676 of the hand guard 670, between the handle portion 616 and the hand guard 670, and protected from potential harm during use of the fruit picker 600. In certain embodiments, the fruit picker 600 also may include a lower guard that is fixedly or removably attached to the picker assembly 610 or the hand guard 670. For example, the lower guard may include mounting holes, similar to the mounting holes 690 of the hand guard 670, which receive the exposed portions of the tabs 632 (i.e., the portions of the tabs 632 extending outward beyond the mounting holes 690) in a similar manner. During use, the lower guard may cover (i.e., be positioned under) and be spaced apart from the bottom surface 622 of the handle portion 616, such that the portions of the user's fingers and thumb are positioned between the lower guard and the handle portion 616. In certain embodiments, the lower guard may be removably attached to the picker assembly 610 or the hand guard 670. In this manner, the lower guard may be selectively attached when desired by a user or removed when use of the lower guard is not desired. In other embodiments, the lower guard may be fixedly attached to the picker assembly 610 or the hand guard 670 for permanent use.

The fruit picker 600 described above may provide several benefits over existing tools for picking fruit from trees. Most notably, the hand guard 670 may effectively protect the user's working hand from potential harm, such as scraped or cut by surrounding tree limbs or other objects, when using the fruit picker 600 to pick fruit from various types of trees, and may eliminate the need for gloves when performing these tasks. Additionally, the configuration of the fruit picker 600 may allow the user to easily grasp the tool in a comfortable and ergonomic manner while keeping the user's working hand protected. Ultimately, the disclosed fruit picker 600 provides a simple, durable, low cost, and easy to manufacture and assemble tool for picking fruit from trees while removing the worry of potential harm to the user's working hand. It will be appreciated that the configuration of the fruit picker 600 may allow the user to easily grasp the tool with the user's right hand or left hand interchangeably. In this manner, the user may alternate which hand is the working hand, as may be desired when using the fruit picker 600 over an extended period of time. Further advantages and benefits of the fruit picker 600 over existing tools will be appreciated from the foregoing description.

Many modifications of the embodiments of the present disclosure will come to mind to one skilled in the art to which the disclosure pertains upon having the benefit of the teachings presented herein through the foregoing descriptions and the associated drawings. Therefore, it is to be understood that the present invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A tool comprising:
   a first rake body having a proximal end and an opposite distal end, the first rake body comprising:
      a handle portion extending from the proximal end toward the distal end of the first rake body, wherein the handle portion has a planar shape defining a top surface, an opposite bottom surface, a first side, and an opposite second side of the handle portion, and wherein the handle portion comprises: a finger opening extending from the top surface to the bottom surface of the handle portion and configured to receive a user's fingers therethrough;
         a first plurality of tabs extending laterally outward along the first side of the handle portion; and
         a second plurality of tabs extending laterally outward along the second side of the handle portion; and
      a first rake portion extending from the distal end of the first rake body to the handle portion, wherein the first rake portion is integrally formed with the handle portion, wherein a majority of the first rake portion has a planar shape and is coplanar with the handle portion, and wherein the first rake portion comprises:
         a plurality of tines; and
         a plurality of cross-members extending between adjacent tines and oriented transverse to a longitudinal extent of the tines; and
      a hand guard attached to the first rake body and positioned over a top surface of the handle portion, wherein the hand guard comprises an open proximal end, an opposite, closed distal end, and a plurality of walls defining an interior space configured to receive the user's hand therein, and wherein the plurality of walls of the hand guard comprises:
         a front wall positioned along the distal end of the hand guard;
         a top wall extending from the proximal end of the hand guard to the front wall;
         a first sidewall extending from the proximal end of the hand guard to the front wall, wherein the first sidewall extends below the bottom surface of the handle portion, and wherein the first sidewall comprises a first plurality of mounting holes engaging the first plurality of tabs; and
         a second sidewall extending from the proximal end of the hand guard to the front wall, wherein the second sidewall extends below the bottom surface of the handle portion, and wherein the second sidewall comprises a second plurality of mounting holes engaging the second plurality of tabs.

2. The tool of claim 1, wherein the hand guard is fixedly attached to the first rake body.

3. The tool of claim 1, wherein the hand guard is removably attached to the first rake body.

4. The tool of claim 3, wherein the first sidewall and the second sidewall of the hand guard are resiliently deflectable away from one another such that the first plurality of mounting holes disengages the first plurality of tabs and the second plurality of mounting holes disengages the second plurality of tabs.

5. The tool of claim 1, wherein the handle portion further comprises a cross-member extending along a width of the first rake body and positioned between the proximal end of the first rake body and the finger opening, and wherein the tool further comprises a top grip member positioned on a top surface of the cross-member and a bottom grip member positioned on a bottom surface of the cross-member.

6. The tool of claim 1, wherein the tines extend below a bottom surface of the first sidewall and a bottom surface of the second sidewall.

7. The tool of claim 1, wherein the front wall, the top wall, the first sidewall, and the second sidewall of the hand guard each have a planar shape, and wherein the plurality of walls of the hand guard further comprises:
   a first transition wall extending from the proximal end of the hand guard to the front wall of the hand guard and from the first sidewall to the top wall of the hand guard and having a planar shape; and
   a second transition wall extending from the proximal end of the hand guard to the front wall of the hand guard and from the second sidewall to the top wall of the hand guard and having a planar shape.

8. The tool of claim 1, wherein the first rake body is formed of sheet metal, and wherein the hand guard is formed of plastic.

9. The tool of claim 1, further comprising:
   a second rake body pivotally attached to the first rake body, the second rake body having a proximal end and an opposite distal end, the second rake body comprising:
      a mounting portion extending from the proximal end toward the distal end of the second rake body and attached to the first rake body; and
      a second rake portion extending from the distal end of the second rake body to the mounting portion, the second rake portion comprising a plurality of tines.

10. The tool of claim 9, wherein the second rake body is configured to pivot relative to the first rake body between a closed position in which the tines of the second rake body are positioned proximate the tines of the first rake body and an open position in which the tines of the second rake body are spaced apart from the tines of the first rake body, and wherein the second rake body is pivotally attached to the first rake body via a spring hinge configured to bias the second rake body toward the closed position.

11. The tool of claim 10, further comprising an actuator attached to the second rake body, wherein the actuator comprises a finger opening configured to receive one or more of the user's fingers therein such that the user may pull the actuator to move the second rake body from the closed position toward the open position.

12. The tool of claim 10, further comprising:
a first mesh covering attached to the first rake body, the first mesh covering comprising:
a top wall extending over a top surface of the first rake body;
a first sidewall extending downward from the top wall of the first mesh covering along a first side of the first rake body; and
a second sidewall extending downward from the top wall of the first mesh covering along a second side of the first rake body; and
a second mesh covering attached to the second rake body, the second mesh covering comprising:
a bottom wall extending under a bottom surface of the second rake body;
a first sidewall extending upward from the bottom wall of the second mesh covering along a first side of the second rake body; and
a second sidewall extending upward from the bottom wall of the second mesh covering along a second side of the second rake body;
wherein the second rake body and the second mesh covering are positioned between the first sidewall and the second sidewall of the first mesh covering when the second rake body is in the closed position; and
wherein the second rake body and the second mesh covering are vertically spaced apart from the first mesh covering when the second rake body is in the open position.

13. The tool of claim 9, wherein the front wall, the top wall, the first sidewall, and the second sidewall of the hand guard each have a planar shape, and wherein the plurality of walls of the hand guard further comprises:
a first transition wall extending from the proximal end of the hand guard to the front wall of the hand guard and from the first sidewall to the top wall of the hand guard and having a planar shape; and
a second transition wall extending from the proximal end of the hand guard to the front wall of the hand guard and from the second sidewall to the top wall of the hand guard and having a planar shape.

14. The tool of claim 12, wherein the distal end of the first rake body extends distally beyond the first mesh covering, and wherein the distal end of the second rake body extends distally beyond the second mesh covering.

15. The tool of claim 12, wherein the first mesh covering and the second mesh covering each are formed as a screened structure comprising a plurality of openings defined therein.

16. The tool of claim 9, wherein the tines of the first rake portion each comprise a finger angled toward the second rake portion, and wherein the tines of the second rake portion each comprise a finger angled toward the first rake portion.

17. The tool of claim 9, wherein a majority of the second rake portion has a planar shape.

18. The tool of claim 9, wherein the first rake body and the second rake body are formed of sheet metal, and wherein the hand guard is formed of plastic.

19. A tool comprising:
a first rake body having a proximal end and an opposite distal end, the first rake body comprising:
a handle portion extending from the proximal end toward the distal end of the first rake body, wherein the handle portion comprises a finger opening configured to receive a user's fingers therethrough; and
a first rake portion extending from the distal end of the first rake body to the handle portion, wherein the first rake portion comprises:
a plurality of tines; and
a plurality of cross-members extending between adjacent tines and oriented transverse to a longitudinal extent of the tines;
a hand guard attached to the first rake body and positioned over a top surface of the handle portion, the hand guard comprising a plurality of walls defining an interior space configured to receive the user's hand therein;
a second rake body pivotally attached to the first rake body, wherein the second rake body has a proximal end and an opposite distal end, wherein the second rake body comprises:
a mounting portion extending from the proximal end toward the distal end of the second rake body and attached to the first rake body; and
a second rake portion extending from the distal end of the second rake body to the mounting portion, wherein the second rake portion comprises a plurality of tines, wherein the second rake body is configured to pivot relative to the first rake body between a closed position in which the tines of the second rake body are positioned proximate the tines of the first rake body and an open position in which the tines of the second rake body are spaced apart from the tines of the first rake body, and wherein the second rake body is pivotally attached to the first rake body via a spring hinge configured to bias the second rake body toward the closed position;
a first mesh covering attached to the first rake body, wherein the first mesh covering comprises:
a top wall extending over a top surface of the first rake body;
a first sidewall extending downward from the top wall of the first mesh covering along a first side of the first rake body; and
a second sidewall extending downward from the top wall of the first mesh covering along a second side of the first rake body; and
a second mesh covering attached to the second rake body, the second mesh covering comprising:
a bottom wall extending under a bottom surface of the second rake body;
a first sidewall extending upward from the bottom wall of the second mesh covering along a first side of the second rake body; and
a second sidewall extending upward from the bottom wall of the second mesh covering along a second side of the second rake body;
wherein the second rake body and the second mesh covering are positioned between the first sidewall and the second sidewall of the first mesh covering when the second rake body is in the closed position; and wherein the second rake body and the second mesh covering are vertically spaced apart from the first mesh covering when the second rake body is in the open position.

20. A tool comprising:
a first rake body having a proximal end and an opposite distal end, the first rake body comprising:
  a handle portion extending from the proximal end toward the distal end of the first rake body, wherein the handle portion has a planar shape defining a top surface, an opposite bottom surface, a first side, and an opposite second side of the handle portion, and wherein the handle portion comprises:
    a finger opening extending from the top surface to the bottom surface of the handle portion and configured to receive a user's fingers therethrough;
    a cross-member extending from the first side to the second side of the first rake body and positioned between the proximal end of the first rake body and the finger opening;
    a first plurality of tabs extending laterally outward along the first side of the handle portion; and
    a second plurality of tabs extending laterally outward along the second side of the handle portion; and
  a first rake portion extending from the distal end of the first rake body to the handle portion, wherein the first rake portion is integrally formed with the handle portion, wherein a majority of the first rake portion has a planar shape and is coplanar with the handle portion, and wherein the first rake portion comprises:
    a plurality of tines; and
    a plurality of cross-members extending between adjacent tines and oriented transverse to a longitudinal extent of the tines;
a hand guard attached to the first rake body and positioned over the top surface of the handle portion, wherein the hand guard comprises an open proximal end, an opposite, closed distal end, and a plurality of walls integrally formed with one another and defining an interior space configured to receive the user's hand therein, and wherein the plurality of walls of the hand guard comprises:
  a front wall positioned along the distal end of the hand guard;
  a top wall extending from the proximal end of the hand guard to the front wall;
  a first sidewall extending from the proximal end of the hand guard to the front wall, wherein the first sidewall extends below the bottom surface of the handle portion, and wherein the first sidewall comprises a first plurality of mounting holes engaging the first plurality of tabs; and
  a second sidewall extending from the proximal end of the hand guard to the front wall, wherein the second sidewall extends below the bottom surface of the handle portion, and wherein the second sidewall comprises a second plurality of mounting holes engaging the second plurality of tabs;
a top grip member positioned on a top surface of the cross-member and between the first sidewall and the second sidewall of the hand guard; and
a bottom grip member positioned on a bottom surface of the cross-member and between the first sidewall and the second sidewall of the hand guard.

* * * * *

UNITED STATES PATENT AND TRADEMARK OFFICE
CERTIFICATE OF CORRECTION

PATENT NO. : 10,244,677 B2
APPLICATION NO. : 15/334531
DATED : April 2, 2019
INVENTOR(S) : Genaro Texidor Page 1 of 1

It is certified that error appears in the above-identified patent and that said Letters Patent is hereby corrected as shown below:

In the Claims

In Column 35, Line 65 (Claim 1), change "over a top surface" to -- over the top surface --.

Signed and Sealed this
Twenty-eighth Day of May, 2019

Andrei Iancu
*Director of the United States Patent and Trademark Office*